United States Patent
Barrows et al.

(10) Patent No.: US 10,012,733 B2
(45) Date of Patent: Jul. 3, 2018

(54) LOCALIZATION METHOD AND APPARATUS

(71) Applicants: Geoffrey Louis Barrows, Washington, DC (US); Gregory Brill, Mahwah, NJ (US); Craig William Neely, Vienna, VA (US)

(72) Inventors: Geoffrey Louis Barrows, Washington, DC (US); Gregory Brill, Mahwah, NJ (US); Craig William Neely, Vienna, VA (US)

( * ) Notice: Subject to any disclaimer, the term of this patent is extended or adjusted under 35 U.S.C. 154(b) by 0 days.

(21) Appl. No.: 15/175,577

(22) Filed: Jun. 7, 2016

(65) Prior Publication Data

US 2016/0357189 A1 Dec. 8, 2016

Related U.S. Application Data

(60) Provisional application No. 62/172,104, filed on Jun. 7, 2015.

(51) Int. Cl.
*G01S 17/42* (2006.01)
*G01S 17/93* (2006.01)
(Continued)

(52) U.S. Cl.
CPC .............. *G01S 17/42* (2013.01); *G01S 5/16* (2013.01); *G01S 17/93* (2013.01); *G05D 1/0246* (2013.01); *H04B 10/50* (2013.01); *H04B 10/60* (2013.01)

(58) Field of Classification Search
None
See application file for complete search history.

(56) References Cited

U.S. PATENT DOCUMENTS

| 4,463,380 A | 7/1984 | Hooks, Jr. |
| 5,130,974 A | 7/1992 | Kawamura et al. |

(Continued)

FOREIGN PATENT DOCUMENTS

| WO | 00/57133 A1 | 9/2000 |
| WO | 2014/204753 A1 | 12/2014 |

OTHER PUBLICATIONS

International Search Report dated Sep. 2, 2016 issued in corresponding application No. PCT/US2016/036188.

(Continued)

*Primary Examiner* — Krishnan Ramesh
(74) *Attorney, Agent, or Firm* — White & Case LLP

(57) ABSTRACT

An apparatus for determining the location and state of an object in an environment is disclosed. Three or more light-emitting beacons are located in the environment, and each beacon transmits a light pattern that contains information needed to identify the beacon. An optical receiver is attached to the object whose location needs to be determined. The optical receiver comprising one or more cameras images the beacons, and identifies the apparent direction from which the beacon is coming based on the pixel or pixels illuminated by the beacon. The optical receiver also decodes the light pattern transmitted by each beacon to identify it. Finally, based on knowledge of the locations of the beacons in the environment and based on the apparent directions from which the beacons appear to be coming, the optical receiver determines its location, and thus the location of the object.

37 Claims, 17 Drawing Sheets

(51) Int. Cl.
*G01S 5/16* (2006.01)
*H04B 10/50* (2013.01)
*H04B 10/60* (2013.01)
*G05D 1/02* (2006.01)

(56) References Cited

U.S. PATENT DOCUMENTS

| | | | |
|---|---|---|---|
| 5,387,993 A | 2/1995 | Heller et al. | |
| 2002/0089722 A1* | 7/2002 | Perkins | G01S 1/70 |
| | | | 398/140 |
| 2002/0154294 A1* | 10/2002 | Hedges | G01S 5/16 |
| | | | 356/141.4 |
| 2003/0025902 A1* | 2/2003 | Hedges | G01C 15/002 |
| | | | 356/141.4 |
| 2006/0146123 A1 | 7/2006 | Sorokin et al. | |
| 2007/0102627 A1 | 5/2007 | Sano et al. | |
| 2008/0036652 A1* | 2/2008 | Shore | E21B 47/02224 |
| | | | 342/357.31 |
| 2009/0148034 A1 | 6/2009 | Higaki et al. | |
| 2011/0074631 A1* | 3/2011 | Parker | G01S 5/16 |
| | | | 342/378 |
| 2011/0254985 A1 | 10/2011 | Hiramoto et al. | |
| 2012/0039612 A1 | 2/2012 | Piazza | |
| 2012/0154824 A1 | 6/2012 | Kim et al. | |
| 2013/0027576 A1 | 1/2013 | Ryan et al. | |
| 2013/0206896 A1 | 8/2013 | Dicander | |
| 2013/0210405 A1 | 8/2013 | Whipple et al. | |
| 2013/0253869 A1* | 9/2013 | Kim | G01C 25/00 |
| | | | 702/94 |
| 2015/0061937 A1* | 3/2015 | Bonawitz | G01S 5/0289 |
| | | | 342/451 |
| 2015/0098709 A1 | 4/2015 | Breuer et al. | |
| 2015/0362921 A1* | 12/2015 | Hanaoka | G01B 11/24 |
| | | | 701/23 |
| 2016/0292905 A1* | 10/2016 | Nehmadi | G01S 17/08 |

OTHER PUBLICATIONS

Written Opinion dated Sep. 2, 2016 issued in corresponding application No. PCT/US2016/036188.
Extended European Search Report dated May 9, 2018.

* cited by examiner

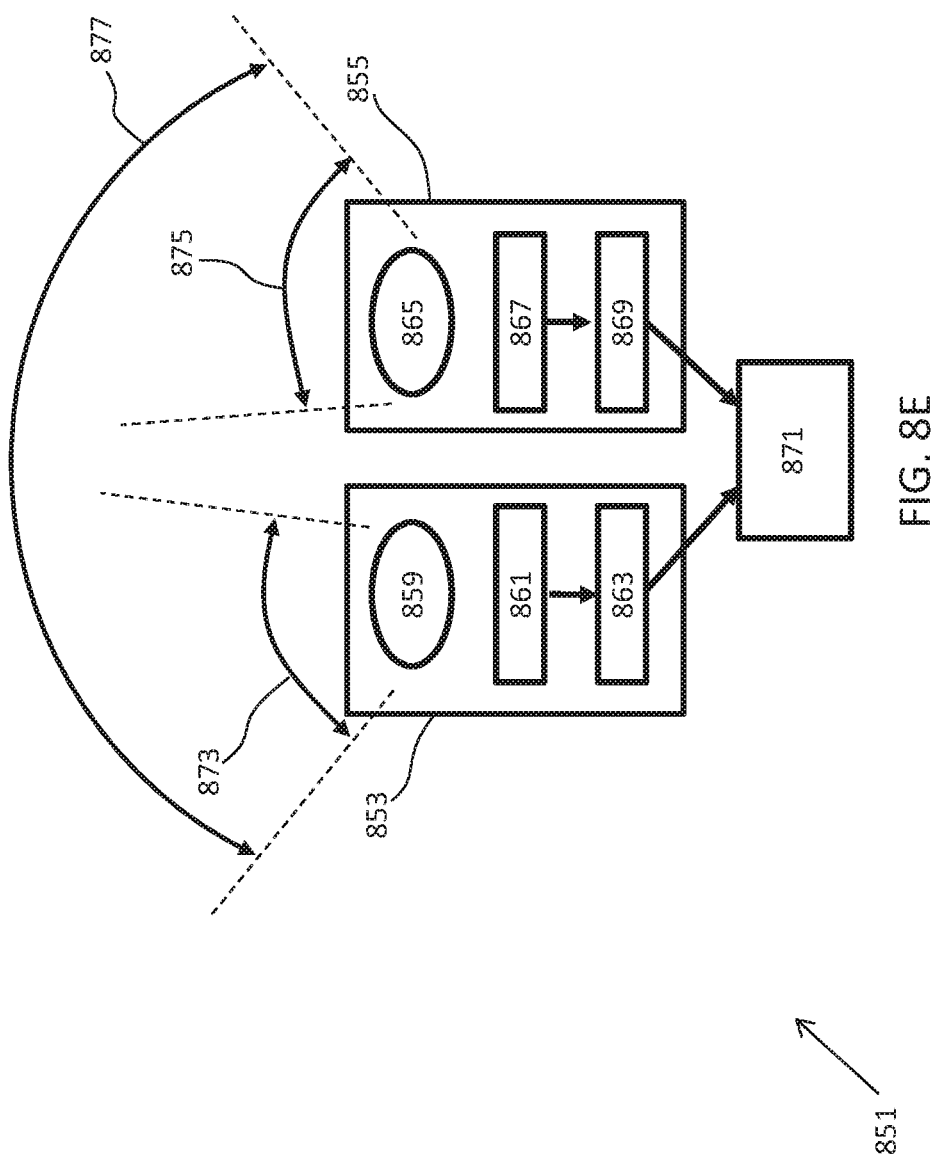

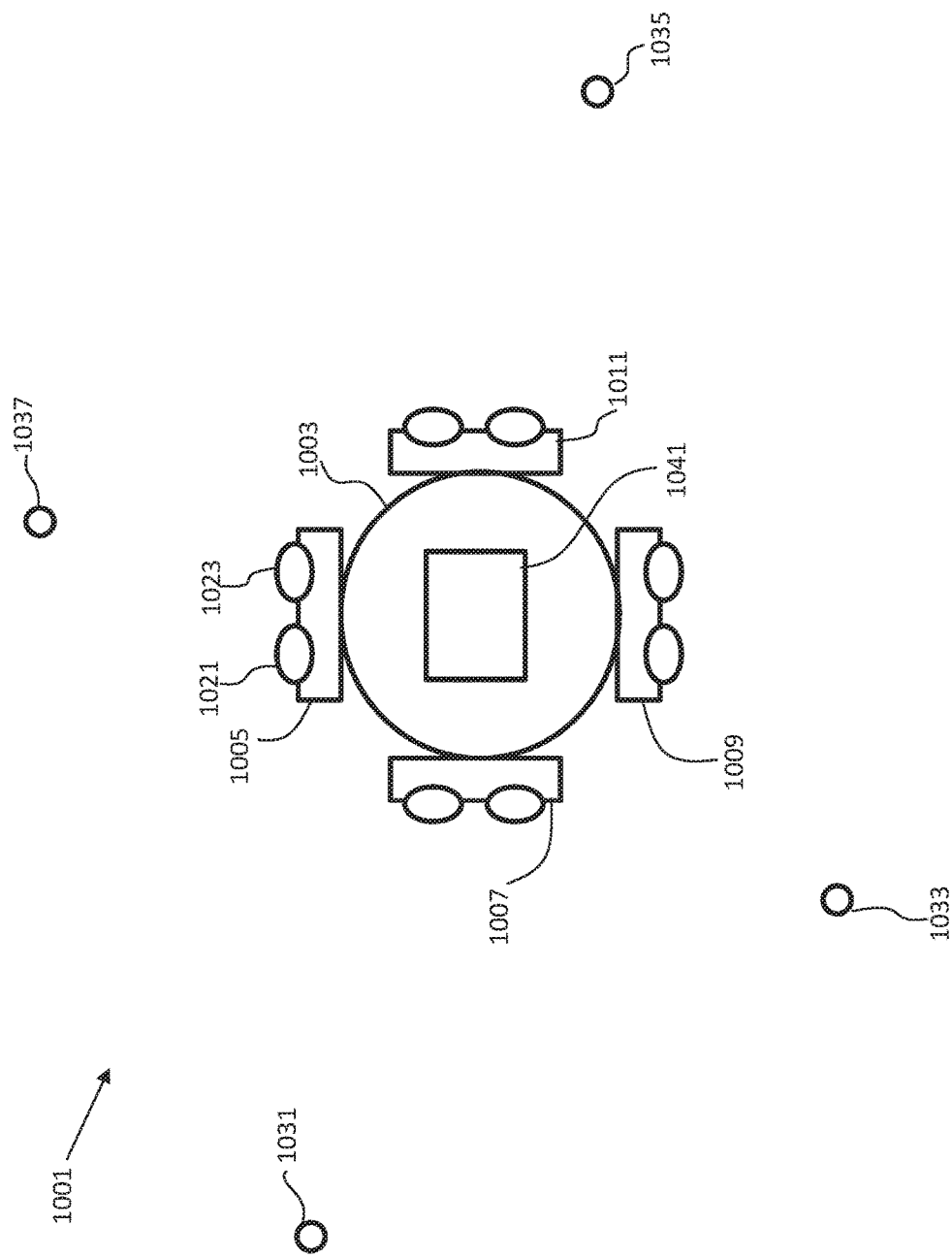

LOCALIZATION METHOD AND APPARATUS

CROSS-REFERENCE TO RELATED APPLICATIONS

This application claims the benefit to U.S. Provisional Patent Application No. 62/172,104 entitled "Localization Method and Apparatus" by G. Brill et al. and filed Jun. 7, 2015.

FIELD OF THE INVENTION

The teachings presented herein relate to the determination of an object's location within an environment.

BACKGROUND OF THE INVENTION

One challenge in robotics is that of determining the 6 degree of freedom (6-DOF) state of a platform within an environment. By 6-DOF state, we refer to both the 3-DOF location of a platform in Cartesian X-Y-Z space and the 3-DOF pose. The X-Y-Z location may be computed in reference to an objective frame of reference, which may be fixed as Earth-bound or attached to another frame of reference. The 3-DOF pose may be expressed as Euler angles (roll, pitch, and yaw) or in quaternions. In this document, we shall refer to the act of determining the 6-DOF state of a platform as the process of "localization".

There are a number of techniques for localizing a platform within an environment. SLAM (simultaneous localization and mapping) techniques have advanced in recent years. However, they generally require substantial processing power and the use of heavy sensor equipment. Such algorithms are also too slow for many applications. Other techniques involve the use of external motion capture systems, in which an environment is populated with cameras that view an object from many angles and from this information compute 6-DOF state. Example equipment includes system manufactured by Optitrak and Vicon. Such techniques are able to produce accurate and fast state estimations, but are expensive and require the environment to be populated with large numbers of cameras.

Another set of techniques involves the use of external beacons which are mounted at known locations in an environment. Such beacons may emit light or RF pulses, which may then be received by a receiver on a platform. Techniques such as time of flight (TOF) and angle of arrival (AOA) may then be used to determine an objects location. The invention described herein is of this latter category.

BRIEF DESCRIPTION OF THE INVENTION

In one embodiment, a system for determining the location of an object in an environment includes a plurality of optical transmitters, each configured to emit an optical transmission different from the optical transmission of another of the plurality of transmitters, wherein each optical transmission includes a signal, and wherein each optical transmitter is positioned at a location spaced apart from another of the plurality of optical transmitters within the environment. The system further includes one or more optical receivers configured to be mounted to the object. The one or more optical receivers are further configured to receive one or more of the optical transmissions and to generate a set of transmitter angle vectors, wherein each transmitter angle vector is associated with one of the plurality of optical transmitters, and is based on the angle between the associated optical transmitter and a reference frame of the one or more optical receivers, and the location of the associated optical transmitter. The system further includes a computing device communicatively coupled to the one or more optical receivers and configured to estimate the location of the object based on the set of transmitter angle vectors and the locations of the three or more optical transmitters.

In one embodiment, the signal is a substantially cyclical signal that is modulated according to a data stream associated with the optical transmitter emitting the optical transmission, and for each optical transmission, the one or more optical receivers are capable of extracting the data stream from the signal, and determining the location of the optical transmitter emitting the optical transmission based on the data stream. In a another embodiment, the substantially cyclical signal has a phase that is modulated according to the data stream.

In one embodiment, each of the one or more optical receivers of the system comprises a camera system. In another embodiment, for each optical transmission, optics of the camera system are configured so that the majority of a light of the optical transmission is acquired by an associated window of pixels that comprises substantially fewer pixels than a total number of pixels within the camera system, and the one or more optical receivers generates the transmitter angle vector using the light acquired by the associated window of pixels. In one embodiment, the camera system is capable of digitizing only the pixels within the window of pixels. In these embodiments, the camera system achieves a higher frame rate than what is possible if the camera system acquires every pixel of the total amount of pixels within the camera system.

In one embodiment, for each optical transmission, the camera system acquires the window of pixels associated with the optical transmission by acquiring pixel signals from an acquisition window of pixels that overlaps the associated window of pixels, and the camera system is configured to move the acquisition window of pixels in response to a relative motion between the optical receiver and the plurality of optical transmitters to continue acquiring the associated window of pixels.

In another embodiment, for each optical transmission, optics of the camera system is configured so that the majority of a light of the optical transmission is focused on an associated window of pixels that comprises substantially fewer pixels than a total number of pixels within the camera system, and the transmitter angle vector associated with the optical transmission is generated based on a location of a brightest pixel of the window of pixels that receives more light than every other pixel of the window of pixels. In yet a further embodiment, the location of the brightest pixel of the window of pixels associated with the optical transmission is determined to a sub-pixel precision using a light intensity of the brightest pixel and light intensities of the pixels in the window of pixels.

In one embodiment, each transmitter angle vector is associated with an image of the associated optical transmitter, and is computed based on a subpixel precision estimate of the location of the image of the associated optical transmitter. In one embodiment, a span angle of the plurality of optical transmitters is greater than 90 degrees when measured from the perspective of the one or more optical receivers. In various embodiments, a field of view of the one or more optical receivers may be greater than 90, 180, and 270 degrees. In another embodiment, a field of view of the one or more optical receivers is substantially omnidirectional.

In one embodiment, the one or more optical receivers comprises a plurality of image sensor chips and a processor. The processor is configured to operate the plurality of image sensor chips and receive image data from the plurality of image sensor chips, and each image sensor chip is configured to monitor a field of view having at least a portion that is different from the other image sensor chips of the plurality of image sensor chips. In another embodiment, the one or more optical receivers comprises a plurality of cameras. Each camera comprises a camera processor and an image sensor, and is configured to monitor a field of view having at least a portion that is different from the other camera of the plurality of cameras. Each camera processor is configured to operate the image sensor of the camera, and is configured to send image data to the computing device.

In one embodiment, a receiver system attached to an object for determining a location of the object in an environment includes one or more optical receivers configured to receive optical data from two or more optical transmitters and to generate a set of transmitter angle vectors. The receiver system further includes a computing device communicatively coupled to the one or more optical receivers and configured to estimate the location of the object based on the set of transmitter angle vectors and locations of the two or more optical transmitters. Each transmitter angle vector is associated with one of the two or more optical transmitters, and is based on the angle between the associated optical transmitter and a reference frame of the one or more optical receivers and the location of the associated optical transmitter.

In one embodiment, each transmitter angle vector is associated with a pixel location in the optical receiver and a set of pixels surrounding the pixel location. The one or more optical receivers comprises a total set of pixels, and is configured to define a first set of pixels to acquire and a second set of pixels to not acquire. The first set of pixels and the second set of pixels are subsets of the total set of pixels, and the one or more optical receivers is configured to acquire the first set of pixels without acquiring the second set of pixels. In one embodiment, the one or more optical receivers is configured to acquire the first set of pixels at a rate greater than 1 second/(the total set of pixels×$T_{pixel}$), where $T_{pixel}$ is a time required for the one or more optical receivers to acquire a single pixel. In another embodiment, the one or more optical receivers is configured to acquire the first set of pixels at a rate greater than 10×(1 second/(the total set of pixels×$T_{pixel}$)), where $T_{pixel}$ is a time required for the one or more optical receivers to acquire a single pixel.

In one embodiment, the one or more optical receivers defines the first set of pixels and the second set of pixels based on the pixel locations associated with the set of transmitter angle vectors. In one embodiment, each transmitter angle vector is associated with a pixel location in the optical receiver and a set of pixels surrounding the pixel location, and the pixel location is determined to an accuracy that is less than a pitch between adjacent pixels of the set of pixels. In one embodiment, the one or more optical receivers are configured to decode an identifier associated with each optical transmitter generating the optical transmissions, and to determine the location of the one or more optical receivers based on a look-up table and the identifier associated with each optical transmitter.

In one embodiment, the receiver system is configured to determine the locations of the two or more optical transmitters based on the optical transmissions. In another embodiment, the receiver system is configured to receive the locations of the two or more optical transmitters from a wireless transmitter in the environment. In one embodiment, the object is a mobile robot and the receiver system is configured to send location information to the mobile robot. The mobile robot is configured to control its motion based on the location information. In another embodiment, the receiver system or the mobile robot further comprises object detection devices capable of detecting objects in the environment that are nearby the mobile robot and generating nearby object information, and the mobile robot is configured to control is motion based additionally on the nearby object information.

In one embodiment, a method for determining the location of an object in an environment includes receiving a plurality of optical transmissions from a plurality of optical transmitters with an optical receiver comprising one or more image sensor chips and extracting an associated signal from each optical transmission. The method further includes generating a plurality of image locations based on the plurality of optical transmissions, wherein each image location is generated based on an optical transmission and a location of the associated optical transmission on the one or more image sensor chips. The method further includes generating a plurality of transmitter angle vectors based on the plurality of image locations and based on the associated signal of each optical transmission and determining the location of the object based on the plurality of transmitter angle vectors and a location of each optical transmitter. In one embodiment, each image location is additionally generated based on light intensities of a plurality of pixels associated with the image location, and is substantially accurate to a precision that is smaller than the pitch of adjacent pixels of the plurality of pixels.

In one embodiment, the method further includes selecting a first set of pixels to acquire, selecting a second set of pixels to not acquire, and acquiring the first set of pixels without acquiring the second set of pixels, where the plurality of optical transmissions are received based on the first set of pixels. In one embodiment, the plurality of optical transmissions is received at a rate greater than 1 second/(a total number of pixels of the one or more image sensor chips× $T_{pixel}$), where $T_{pixel}$ is a time required by the optical receiver to acquire a single pixel from the one or more image sensor chips.

BRIEF DESCRIPTION OF THE FIGURES

FIG. 8E depicts a block diagram of a multiple camera receiver, according to one embodiment of the invention.

FIG. 10 depicts a combined stereo vision and localization system, according to one embodiment of the invention.

DETAILED DESCRIPTION OF THE INVENTION

Coordinate System for Purposes of Discussion

Figure 1:
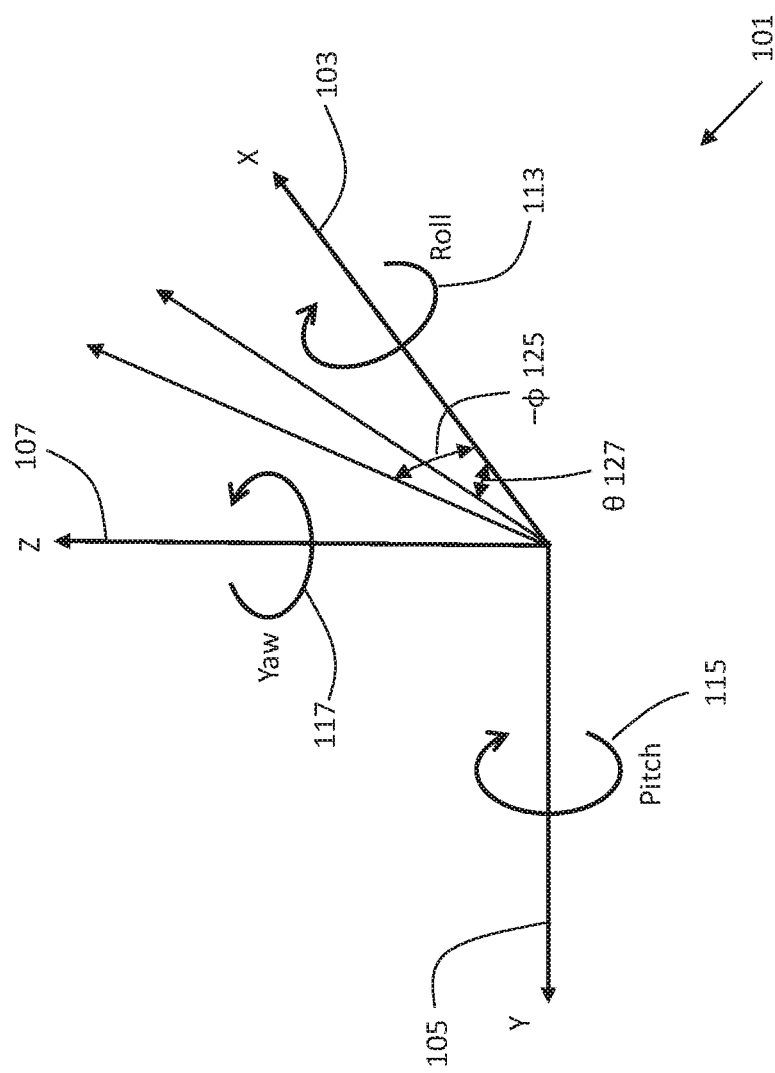
FIG. 1 depicts a coordinate system, according to one embodiment of the invention.

Refer to FIG. 1 for a depiction of the coordinate system 101 we will use in the teachings below. It shall be understood that the depicted coordinate system 101 is for illustrative purposes and that other coordinate systems may be used, including the use of quaternions for representing pose, and the coordinate system 101 depicted is used for purposes of illustration. We will in general refer to the forward direction 103 as "positive X" and the left-ward direction 105 as "positive Y". Therefore, following the right-hand rule, the vertical direction upward 107 will be "positive Z". For pose, we will define rotations around these axes using the right-hand rule. Positive roll 113 is clockwise rotation around the X-axis as shown, and may be referred to with the variable $\psi$ (not shown). Positive yaw 117 is rotation to the left around the Z-axis as shown. A yaw angle e.g. 127 may be referred to with the variable $\theta$. Positive pitch 115 is rotation around the Y-axis to tilt forward. A pitch angle 125 may be referred to with the variable $\varphi$ (the pitch angle 125 shown in FIG. 1 is actually a negative pitch angle by our right-hand rule definition). The three pose angles 113, 117, and 115 will be applied in the order of roll, yaw, and pitch. Thus roll and yaw cover a full circle, and may vary over the angles from $-\pi$ to $+\pi$ radians. Pitch covers a half circle, and may vary over the angles from $-\pi/2$ to $+\pi/2$ radians. Thus the 6-DOF state vector may comprise the six variables X, Y, Z, $\theta$, $\varphi$, and $\psi$, or alternatively X, Y, Z, Y, P, and R, the latter three variables indicating yaw, pitch, and roll angles.

Figure 2:
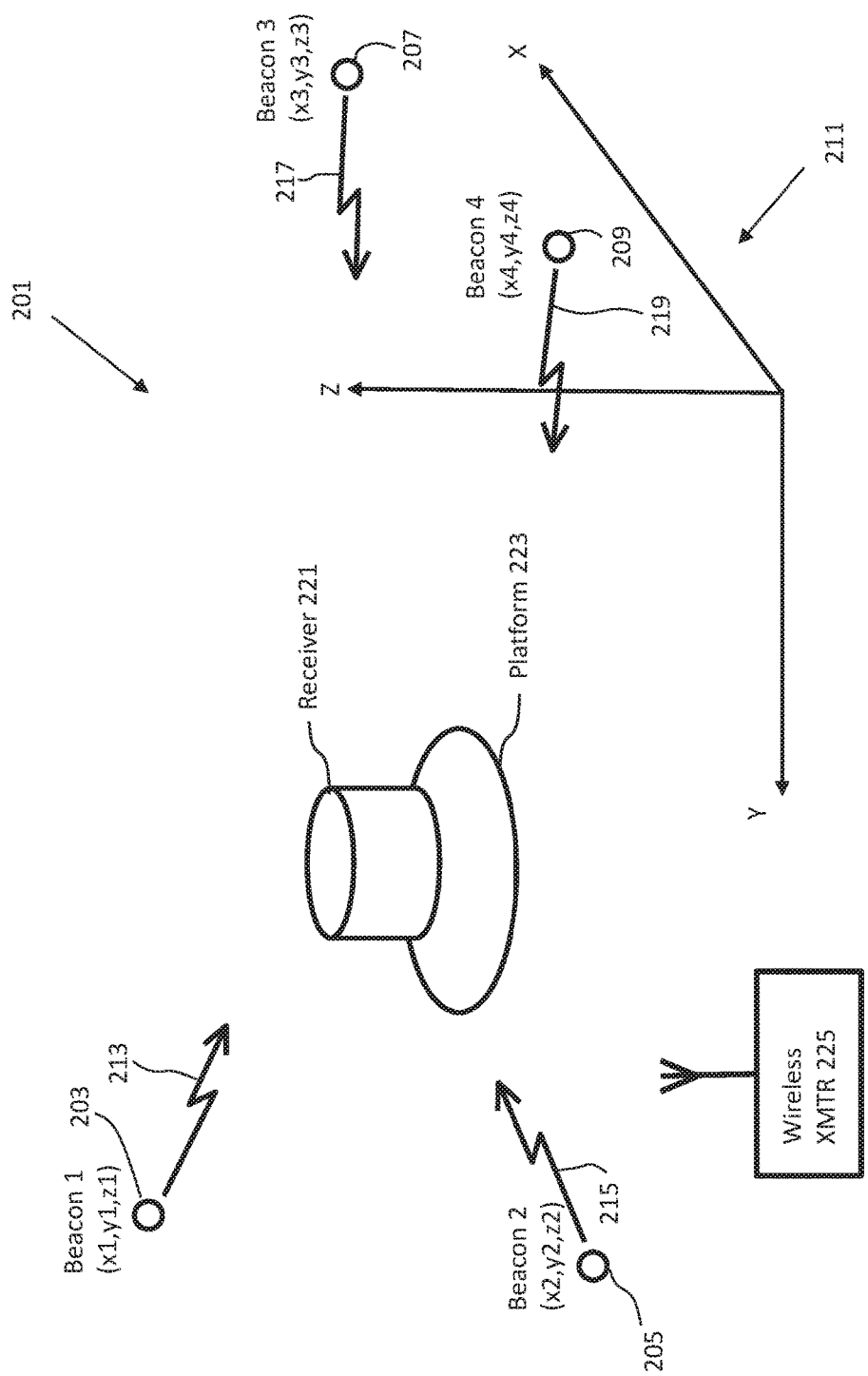
FIG. 2 depicts a localization system within an environment, according to one embodiment of the invention.

Refer to FIG. 2, which depicts a localization system 201 within an environment. Three or more beacons (e.g. 203, 205, 207, and 209) are distributed through the environment at fixed locations. Each beacon has an identifying number and is fixed at a known X-Y-Z location relative to a coordinate system 211 in the environment. At least three beacons are desired, but as will be described below, it is beneficial for the environment to contain more than three beacons. The beacons 203, 205, 207, and 209 may be mounted on walls or other rigid surfaces in the environment. Each beacon 203, 205, 207, and 209 transmits an optical pattern (e.g. 213, 215, 217, and 219) that indicates its identifying number and/or its X-Y-Z location.

The light 213, 215, 217, and 219 emitted by the beacons 203, 205, 207, and 209 is received by a receiver 221 which may be fixed to a platform 223. The receiver 221 may comprise a single camera, ideally having a wide field of view, or may comprise a number of cameras pointed in different directions to cover a wide field of view (not shown). The receiver 221 detects the signals 213, 215, 217, and 219 from the respective beacons 203, 205, 207, and 209, and based on both the apparent angles of the beacons as viewed from the receiver 221 and the known locations of the beacons, determines the 6-DOF state of the receiver 221. Further details of this system 201 will be described below. Since the beacons 203, 205, 207, and 209 transmit light, they may also be referred to as "transmitters". In the teachings below, we may use the word "beacon" and "transmitter" interchangeably.

In various embodiments, the receiver 221 will know the X-Y-Z locations of the individual beacons 203, 205, 207, and 209. In this case, the beacons 203, 205, 207, and 209 need only transmit their identifying number (for example, "1", "2", "3", or "4") which the receiver 221 can use to look up the beacon's location using a look-up table containing the locations of all beacons 203, 205, 207, and 209. In this case, for example, the signal 213 transmitted by beacon 1 203 may just contain the number "1". In applications where the receiver 221 will not know the X-Y-Z locations of the beacons 203, 205, 207, and 209, an external wireless transmitter 225 may transmit this information to the receiver 221. Such data may be sent over any appropriate radio or other medium, or over a protocol such as Bluetooth or Wi-Fi or something else. In this case, for example, the wireless transmitter 225 may thus transmit the values xi, yi, and zi for each beacon 203, 205, 207, and 209 where i is in 1 . . . 4 (e.g. spans all beacons in the environment). In another variation, each beacon 203, 205, 207, and 209 may directly transmit its X-Y-Z location, however this will increase the amount of data that needs to be sent by the beacons 203, 205, 207, and 209. In this case, for example, the signal 213 may contain the variables x1, y1, and z1 which define the location of beacon 1 203.

Transmitting Data Over Light

Figure 3:
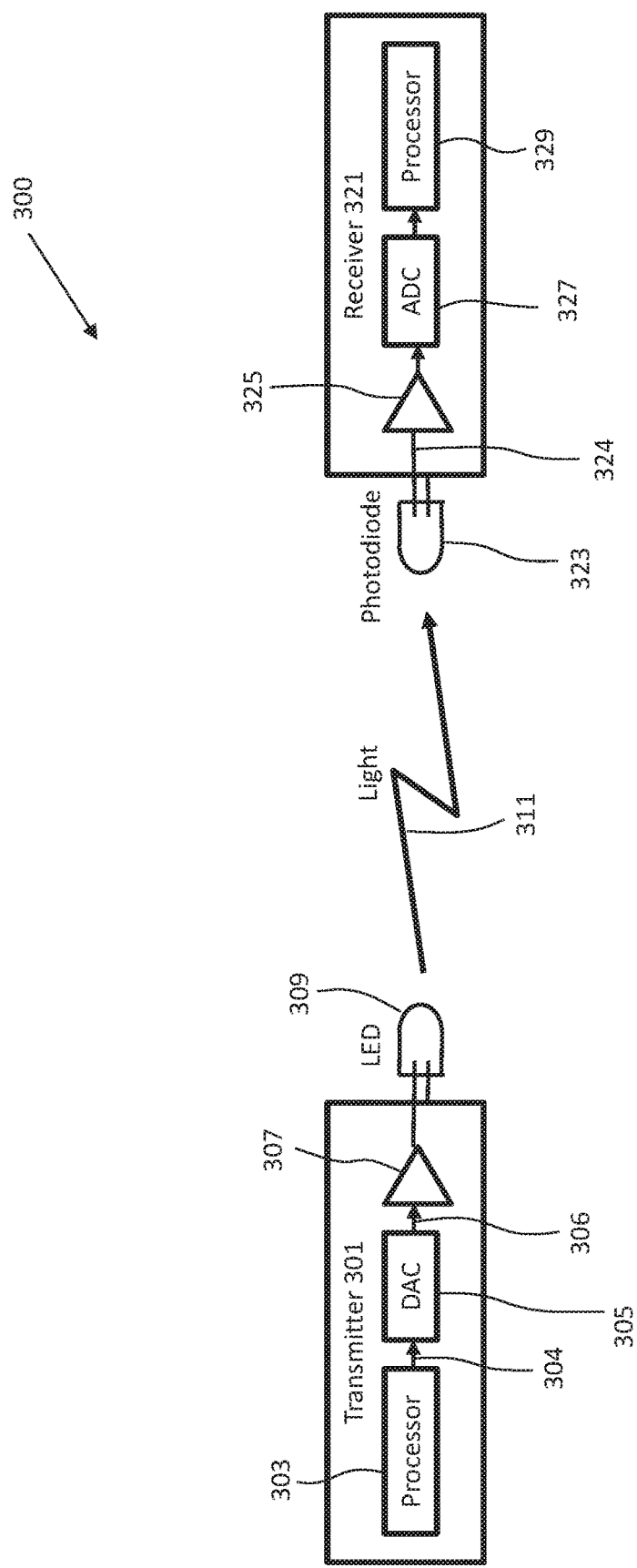
FIG. 3 depicts an apparatus for transmitting data over light, according to the prior art.

Refer to FIG. 3, which depicts a prior art apparatus 300 for transmitting data over light, comprising a transmitter 301 which generates light 311 that is received by a receiver 321. On the transmitter 301, a processor 303 computes the data to be sent and generates a signal 304 to be transmitted. A digital to analog converter 305 generates an analog signal 306, either a voltage or a current, based on the output 304 of the processor 303. An amplifier 307 uses this analog signal 306 to drive a light emitter 309, such as a light emitting diode (LED). The resulting light 311 is transmitted to a receiver 321. The receiver 321 contains a photodiode 323 that generates electrical currents or voltages 324 based on the light 311 reaching it. These signals 324 are digitized by an analog to digital converter 327 and processed by the receiver processor 329. It will be understood that some of the components listed may be physically implemented together in one chip or package, for example the DAC 305 and amplifier 307 on the transmitter processor 303, or the amplifier 325 and ADC 327 on the receiver processor 329.

Techniques for transmitting data over light are an established art, with many different schemes possible. For example, on-off keying (OOK) may be used, with the light turned on and off to transmit binary zeros and ones. The timing sequence could be based on UART or other serial protocols. Manchester coding is another well-known method, which is often used for example in remote controls for consumer electronics devices. In Manchester coding, digital zeros may be sent with by turning off the LED 309 for a period of time and then turning on the LED 309 for the same period of time, and digital ones may be sent by first turning on the LED 309 and then turning it off. Manchester coding has the advantage of allowing easy recovery of the pulse clock in case the transmitter processor 303 and receiver processor 329 are operating at slightly different frequencies.

Figure 4A:
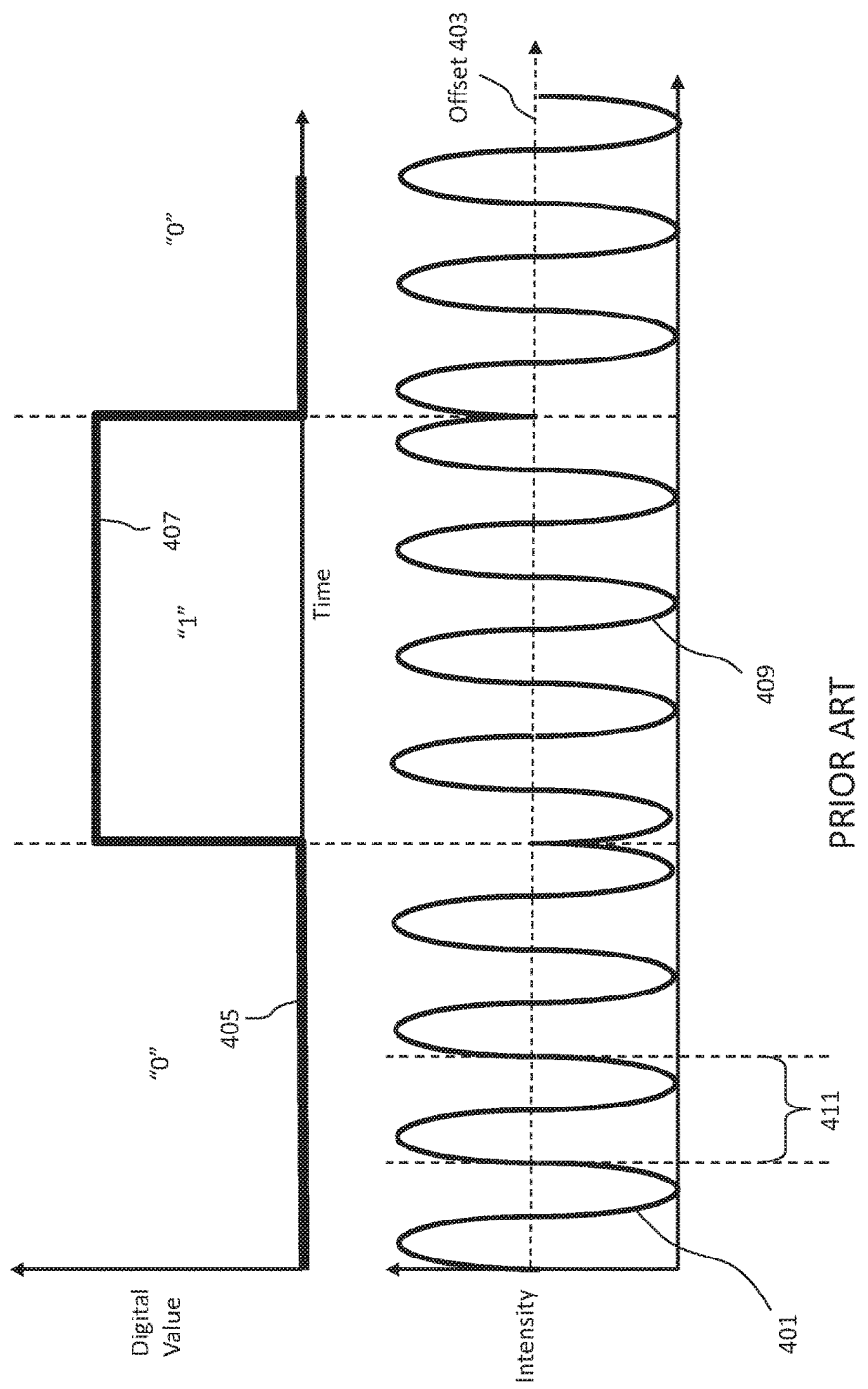
FIG. 4A depicts binary phase shift keying, according to the prior art.

Another viable method is to use a variation of binary phase shift keying (BPSK), an established and well-known technique used in wireless (radio-based) transmission of digital data. Refer to FIG. 4A, which depicts binary phase shift keying according to the prior art. In BPSK, a base carrier wave 401 is generated, generally in the form of a sinusoid. One carrier wave cycle 411 defines the minimum pattern that defines the carrier wave 401, with the carrier wave cycle 411 generally repeated to form the carrier wave 401. When sent optically, the transmitter 301 of FIG. 3 may be programmed to generate an approximate sinusoid using the digital to analog converter 305. Note that in wireless radio transmission, a sinusoid typically has both positive and negative values and has a mean of about "zero". However, when transmitted optically, the sinusoid may be offset by an offset value 403 as shown so that it always (or almost always) generates light. For example, the LED may be at full intensity when the raw sinusoid is most positive, half intensity when the raw sinusoid is zero, and zero intensity when the raw sinusoid is most negative. A digital zero 405 may be sent by transmitting just the sinusoid 401, while a digital one 407 may be sent by flipping the phase of the sinusoid to 180 degrees out of phase for example as shown in the wave pattern 409. In general, the transmission of each bit may last for an integer number of carrier wave cycles, for example 4 cycles as shown in FIG. 4A.

It is beneficial for the carrier wave 401 to be a sinusoid generated using a sine or cosine function, but other types of carrier waves may be used, for example triangle waves or other waves. For purposes of definition, a "cyclical signal" is any signal that is generated based on a wave form (such as the cycle 411) that is repeated.

Figure 4B:
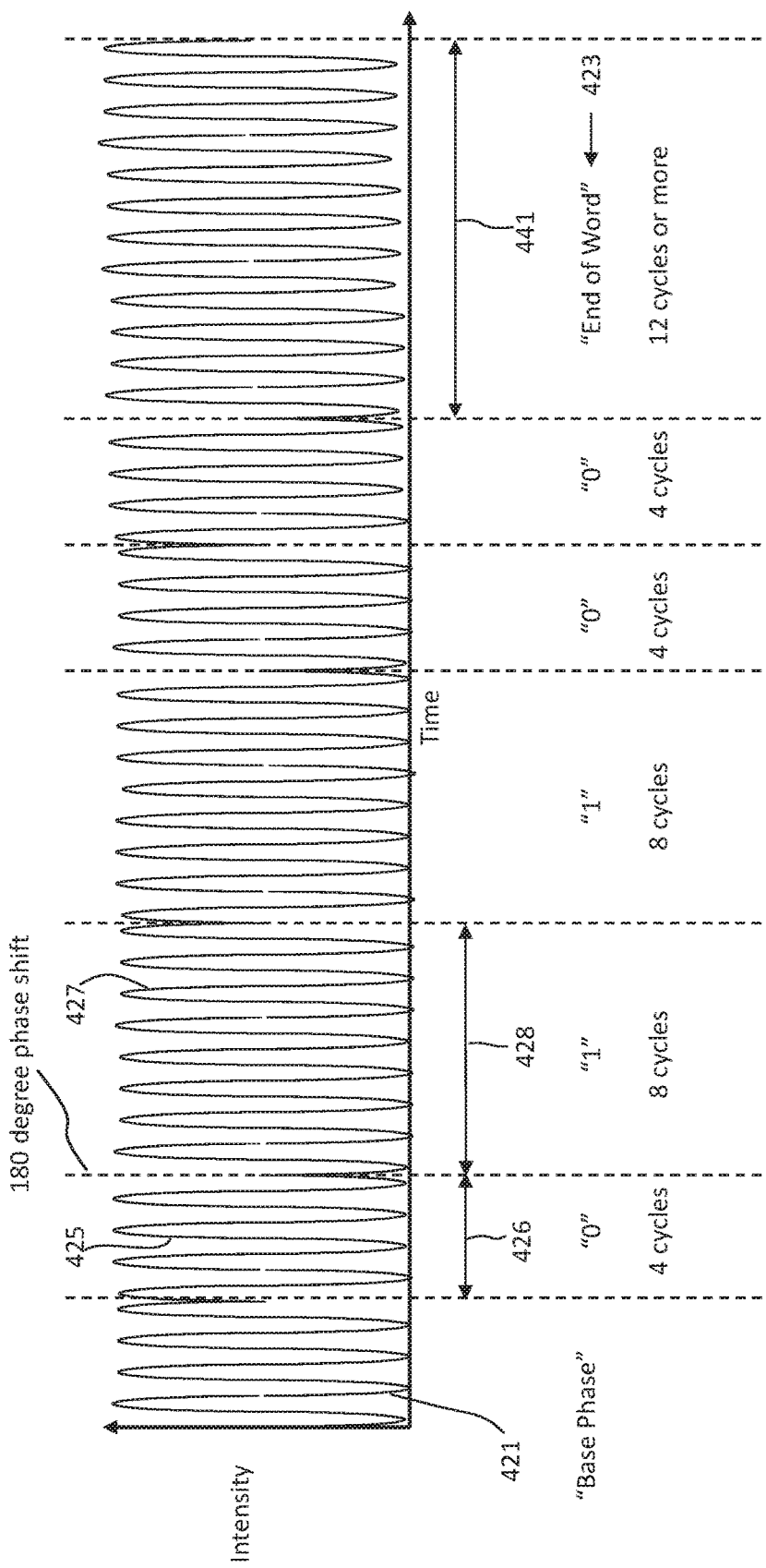
FIG. 4B depicts an exemplary method of using binary phase shift keying, according to one embodiment of the invention.

Refer to FIG. 4B, which depicts an alternative exemplary method of using binary phase shift keying, according to one embodiment of the invention. In this method, the phase of the carrier wave 421 is flipped every time a new bit is sent, but the duration over which the carrier wave was held in its current phase before flipping again is used to indicate whether a binary zero or one is transmitted. In the example shown in FIG. 4B, the binary word 01100 423 is sent as follows: The carrier wave starts at a base phase 421. Then it flips to the inverse phase 425 for a short period 426 (here four carrier wave cycles) to send the first "0", and then it flips back to the base phase for a longer period 428 (here eight carrier wave cycles) to send the first "1". The remaining three bits "1", "0", and "0" are then sent. The carrier wave then holds its current phase for a longer "reset period" 441 (here twelve carrier wave cycles) to indicate that the binary word has been sent. If an odd number of bits are sent, then the phase of the carrier wave 421 after the word is sent is the same as it was before the word was sent. If an even number of bits are sent, then the carrier wave base phase 421 flips every time a new word is sent. For purposes of discussion, in the teachings below we will assume that the binary word contains an odd number of bits so that the base phase remains constant, though it will be understood that the principles may be applied to implementations in which an even number of bits are transmitted.

Let us now discuss how the word 423 transmitted on the carrier wave may be received. In one exemplary method, the receiver may measure the light intensity over four equally spaced parts of one carrier wave cycle. For example, if the carrier wave is a 100 Hz sinusoid, then the light intensity may be sampled by the receiver ADC 327 and processor 329 at 400 Hz or once every 2.5 milliseconds, so that four samples span one carrier wave cycle 411. From these four samples x1, x2, x3, and x4, we may compute an "in-phase" value I=x1−x3, and a "quadrature" value Q=x2−x4. Note that this definition of I and Q subtracts out any offset 403 used to generate the sinusoids as shown in FIG. 4A and FIG. 4B.

Figure 5A:
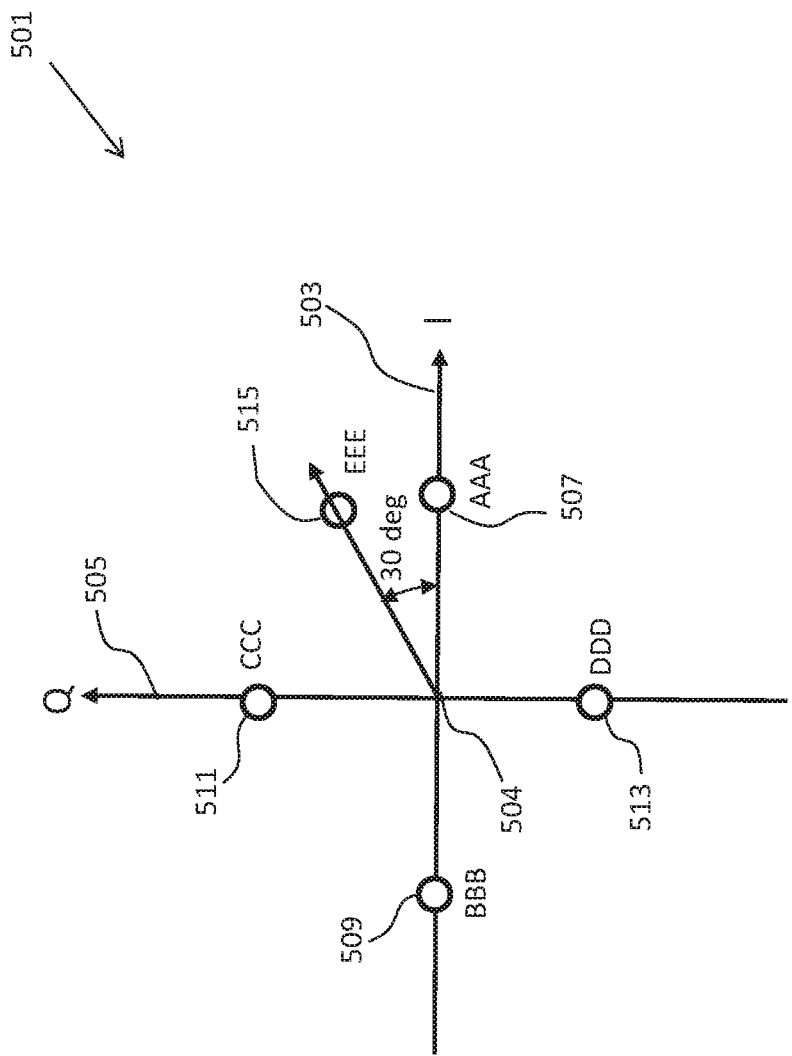
FIG. 5A depicts an IQ plot, according to one embodiment of the invention.

Refer to FIG. 5A, which depicts an IQ plot 501, with an I axis 503 and a Q axis 505, according to one embodiment of the invention. Suppose the transmitter 301 and the receiver 321 are operating at exactly the same frequency, e.g. the receiver 321 samples the received light 311 at exactly four times the rate of the carrier wave frequency used by the transmitter 301. Suppose the transmitter 301 and receiver 321 are "in phase", so that x1 is sampled at exactly the time instant that the carrier wave is most positive e.g. the LED 309 is brightest. The values I and Q will define location AAA 507, which is on the positive I axis 503 at a distance from the origin 504 depending on the signal strength. Over subsequent transmissions of the carrier wave and repeated samplings of x1, x2, x3, and x4, the measured I and Q values will still land at location AAA. If the received carrier wave changes in intensity, the distance of point AAA 507 to the origin 504 will change accordingly, but point AAA 507 will remain on the positive I axis 503. Suppose now the carrier wave was flipped to 180 degrees out of phase, but the transmitter and receiver are otherwise locked to the same frequency. The value I and Q will land at location BBB 509, on the negative I axis.

For purposes of discussion, we may use the terms "IQ value" and "IQ location" to refer to respectively the I and Q values as a two dimensional vector and the location in IQ space on the IQ plot of the IQ value. The "angle" of an IQ value may thus be a tan 2(Q,I), where a tan 2(y,x) is the four-quadrant arc-tangent function. Thus a value having pure positive I will have an angle of 0 degrees, while a value having a pure positive Q value an angle of 90 degrees.

The resulting IQ plot will vary depending on other circumstances. Suppose the transmitter 301 and receiver 321 are operating at the same frequency, but are out of phase. If they are 90 degrees out of phase, the values of I and Q may land at locations CCC 511 or DDD 513, depending on whether the transmitter 301 leads or lags the receiver 321. Location EEE 515 would correspond to a phase difference of 30 degrees.

Figure 5B:
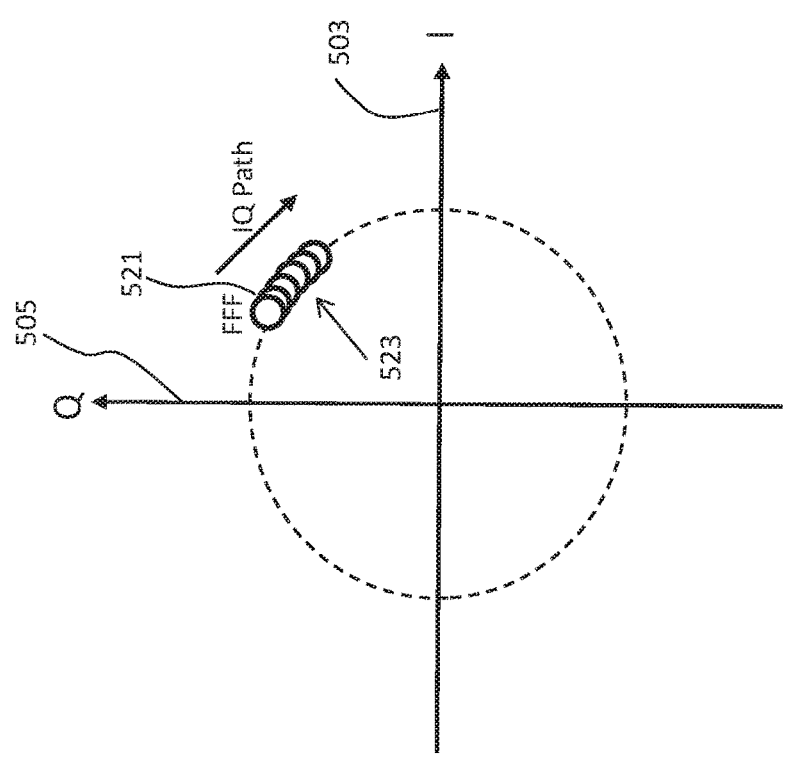
FIG. 5B depicts an IQ plot when transmitter and receiver frequencies are mismatched, according to one embodiment of the invention.

Now let us consider the case where the transmitter 301 and receiver 321 are operating at slightly different frequencies, perhaps different by a percent. This can happen when, for example, the clock devices defining the operating frequencies of the transmitter processor 303 and receiver processor 329 are different. Refer to FIG. 5B, which depicts an IQ plot when transmitter 301 and receiver 321 clock frequencies are mismatched, according to one embodiment of the invention. Due to the frequency mismatch, the IQ value will move for every new cycle of four samples e.g. every new carrier wave cycle. For example, at the first carrier wave cycle the IQ value may start at location FFF 521, and then move clockwise (for example along the path 523 shown in FIG. 5B) or counterclockwise over subsequent carrier wave cycles along a circular path depending whether the transmitter 301 is operating faster than or slower than the receiver 321. This path 523 may be referred to as an "IQ path" for discussion purposes. The rate which the IQ value moves around the origin depends on the relative mismatch between the transmitter 301 and receiver 321 frequencies.

Figure 5C:
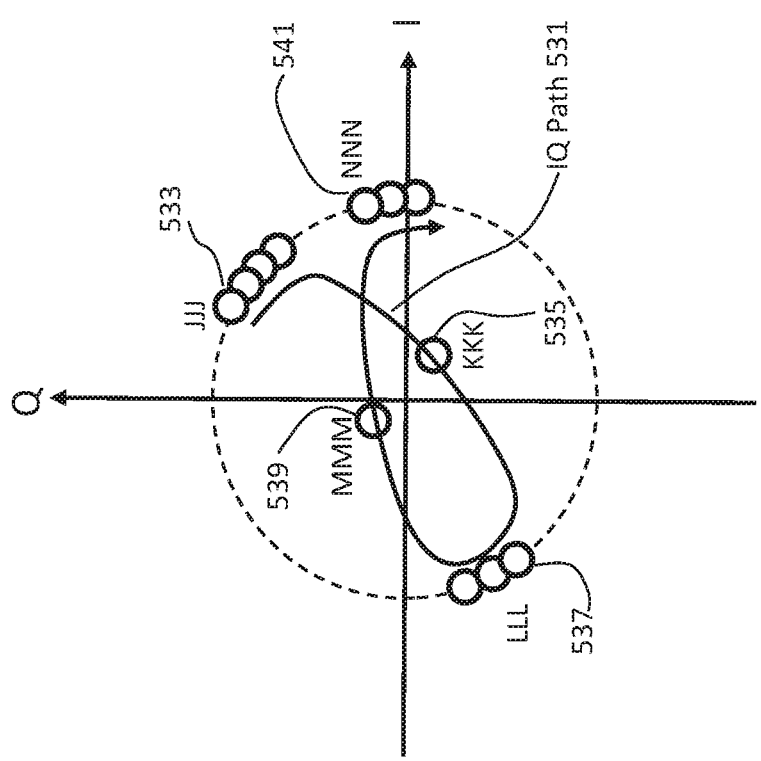
FIG. 5C depicts a sample IQ path that may occur over two BPSK phase shifts when the transmitter and receiver frequencies are mismatched, according to one embodiment of the invention.

Refer to FIG. 5C, which illustrates a sample IQ path that may occur over two BPSK phase shifts when the transmitter 301 and receiver 321 frequencies are mismatched. Suppose the carrier wave stays at the base phase for four cycles, and then flips phase for four cycles, and then reverts back to base phase for four cycles. Suppose the IQ value of the first cycle is at location JJJ 533. The next few IQ values generated over the next few carrier wave cycles may exhibit a drift as shown (or may exhibit a drift in the opposite direction depending which of the transmitter or receiver is faster and which is slower). Then the carrier wave will flip phase 180 degrees. Depending on the phase difference between the transmitter 301 and the receiver 321, for one cycle of values x1, x2, x3, and x4 as measured by the receiver 321, the resulting IQ value may be substantially displaced from location JJJ 533 and land at a location such as location KKK 535. This is because the four values x1 through x4 sample part of a base phase carrier wave cycle and part of a flipped phase carrier wave cycle.

For the next few cycles, the IQ values will move to a location such as LLL 537, which is opposite from JJJ 533 across the origin. This is due to the carrier wave being flipped 180 degrees out of phase. Then the carrier wave may flip 180 degrees again to the base phase, and there may be one IQ value at another displaced location such as location MMM 539, and then the next IQ value will land at about location NNN 541, and subsequent IQ values will continue the original trajectory from location JJJ 533. The process of tracking the IQ location of a signal over subsequent carrier wave cycles, even in the presence of phase shift keying, may be referred to as a process for tracking the phase of the carrier wave.

One significant challenge is that of handling the receiver 301 and transmitter 321 being out of phase and operating at slightly mismatched frequencies. If the receiver is monitoring just one transmitter 301, there are a variety of techniques that may be borrowed from the art of the wireless transmission of digital data that may be used. This may include a combination of phase locked loops and delay locked loops to adjust the timing of the acquisition of values x1, x2, x3, and x4 to be in phase with the transmitter 301, or it may involve modulating the receiver's clock to synchronize with the transmitter's 301 clock. However, if the receiver 321 has multiple photodiodes, and is capable of monitoring the signals transmitted by more than one transmitter 301, each operating at a slightly different frequency, other techniques may be more beneficial, which will be discussed in a subsequent section of the teachings herein.

Let us define a few functions: Let angles cover the range $-\pi$ to $+\pi$ as measured in radians. Since a circle covers $2\pi$ radians, any angle a is considered equal to the angles $a+n2\pi$ where n is an integer. The circular distance $Dc(a,b)$ between two angles a and b around a continuous circle is the smaller of the two angles between points a and b around the circle. Thus the circular distance between the angles $\pi/4$ and $+\pi$ is $3\pi/4$. Similarly, the circular distance between $\pi/4$ and $-\pi/4$ is $\pi/2$. However the circular distance between $-3\pi/4$ and $+3\pi/4$ is also $\pi/2$. The concept of a circular distance is well-known in the fields of trigonometry and signal processing.

Figure 6:
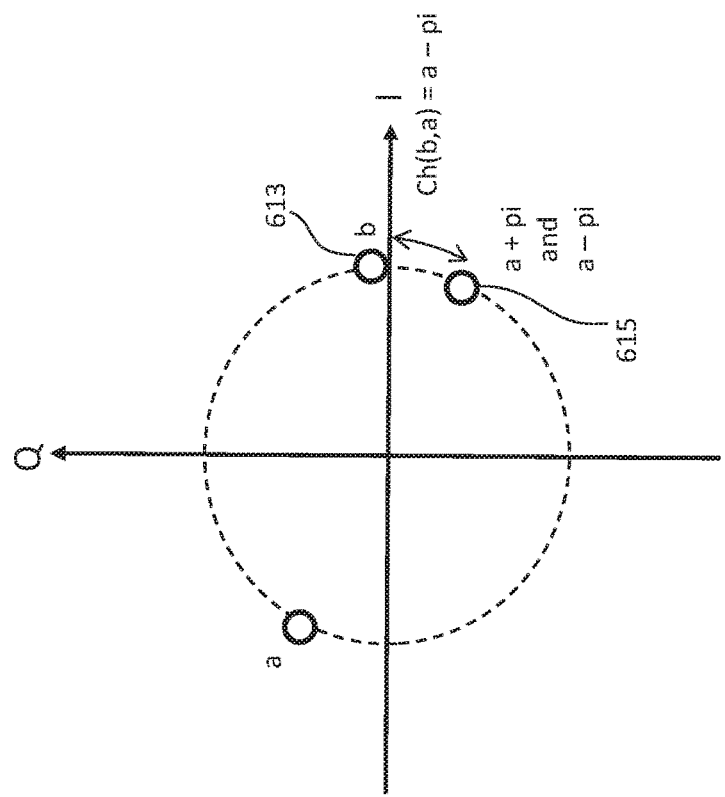
FIG. 6 depicts the concept of a closest half-circle angle, according to one embodiment of the invention.
Figure 6:
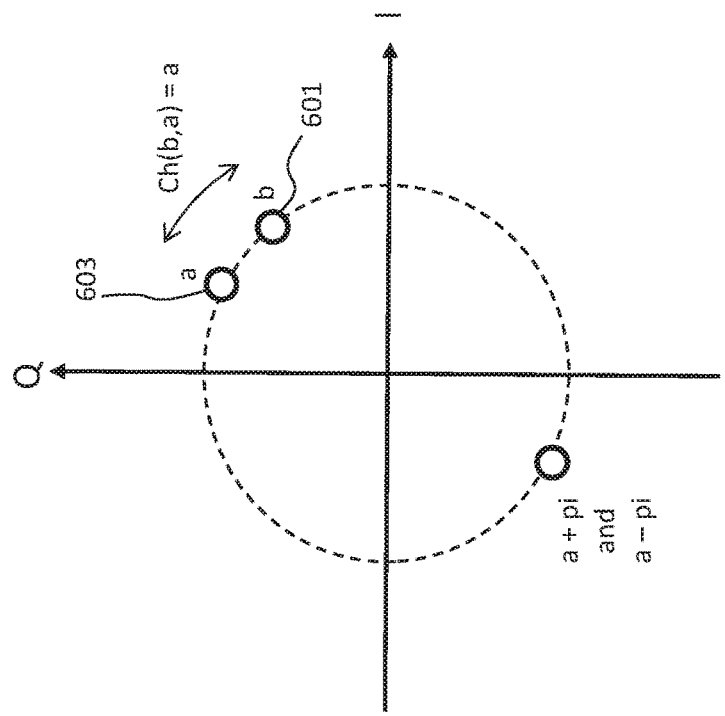

Refer to FIG. 6, which illustrates the concept of a closest half-circle angle, according to one embodiment of the invention. For a point b, let us define its closest half-circle angle of a as the numbers $a-\pi$, a, and $a+\pi$ that is closest to b: $Ch(b,a)$=whichever of $\{a-\pi, a, a+\pi\}$ that is closest to b. Note by "closest" we mean "minimum difference" and not "circular distance." In FIG. 6 (left), b 601 is closest to a 603, therefore $Ch(b,a)$=a, whereas in FIG. 6 (right), b 613 is closest to $a-\pi$ 615, therefore $Ch(b,a)=a-\pi$. Note that $Ch(b,a)$ can have a value outside of the range $-\pi$ to $+\pi$. For example, $Ch(7\pi/8,\pi/4)=5\pi/4$ and $Ch(-7\pi/8, -\pi/4)=-5\pi/4$.

Finally, let us define the magnitude of a point A in IQ space as: $M(A)=\sqrt{I(A)^2+Q(A)^2}$, where $I(A)$ is the in-phase component of A, and $Q(A)$ is the quadrature component of A.

We can now describe an algorithm that tracks the phase of a carrier wave and detects the flipping of the carrier wave as follows:

Algorithm 1:
  Initialization: Set $\alpha$=0.02 (or some other value), flag=1, base=0, and flipped=0. The value $\alpha$ is an adaption parameter and may be used to define how mismatched the transmitter and receiver clock rates are.
  Step 1: Acquire samples x1, x2, x3, and x4, the aforementioned four sampling points of one carrier wave cycle, and compute I and Q from these samples by I=x1−x3 and Q=x2−x4.
  Step 2: Set a equal to the angle defined by the computed IQ point. This may be computed using a four-quadrant arctangent function a tan 2(y,x), with a=a tan 2(Q,I)
  Step 3: If flag==1 then go to Step 9
  Step 4: set ta=Ch(base,a).
  Step 5: set base=base+$\alpha \times$(ta−base)
  Step 6: if base<$-\pi$, then set base=base+$2\pi$
  Step 7: if base>$+\pi$, then set base=base−$2\pi$
  Step 8: go to step 10
  Step 9: set base=a and set flag=0
  Step 10: Set $M=\sqrt{I^2+Q^2}$
  Step 11: If M<threshold then go to Step 13
  Step 12: if Dc(base,a)<$\pi/2$ then set flipped=0, otherwise set flipped=1
  Step 13: output value flipped for this step
  Step 14: go to step 1 and repeat for the next carrier wave cycle.

What algorithm 1 does is compute an angle base that tracks the phase of the carrier wave even in the presence of a small frequency mismatch. If the carrier wave does not flip phase, then the angle base will track the phase angle a, with a small lag due to the low pass filtering nature of step 5. The parameter $\alpha$ determines the lag of the low-pass filter, and may be empirically determined but will generally be a value much closer to zero than to one. However, when the carrier wave flips phase by 180 degrees, the angle base will lock not onto the actual carrier wave phase but the original unflipped phase as computed in step 4.

The condition of the phase being flipped may then be computed by measuring the circular distance between the base and the angle a of the current IQ sample point. Step 11 is an optional step that implements hysteresis by preventing the detected phase from flipping if the magnitude of the IQ signal is sufficiently small. The threshold value may be chosen to be smaller than the value M that would be generated by the weakest beacon in the environment. The threshold may also be adaptive to the intensity of the beacon, for example 20% or 50% of a running average of M. The stream of values flipped generated in step 13 may then be sent to other algorithms that can detect the transmission of zeros and ones in accordance with FIG. 4B.

Note that flipped indicates whether or not the carrier wave's phase has been flipped—the values "0" 405 and "1"

407 of FIG. 4A would be represented by flipped. Variations of the above algorithm 1 are possible—the hysteresis function may be based not on the magnitude M from Step 11, but on the circular distance Dc(base,a) requiring it to be close to either 0 or π Another variation would be to perform the adaption of Step 5 in Step 12, thus the angle base would not be adapted when the samples x1, x2, x3, and x4 occur over a time interval in which the carrier wave is flipped for some of the four samples but not flipped for the remainder.

Once the values of the variable flipped, as computed in the above algorithm 1, are extracted, individual bits and whole words may be received. The algorithm to extract words would depend on the specific encoding scheme used to transmit bits in a carrier wave and any variations thereof. For example, if the data is transmitted using the method depicted in FIG. 4B, bits of zero or one may be received by measuring the time interval between phase flippings, and if the phase stays the same for a long period of time, that may indicate that the complete word has been sent and a new base phase is selected.

Using FIG. 4B as an example, suppose during the execution of Algorithm 1 above, variable flipped stayed the same value for more than 10 cycles, which would indicate a word is not being sent. Then suppose flipped changes value. This would indicate a new word is being sent. Suppose flipped then changes value again, but in less than 6 cycles but more than 2 cycles. This may indicate that the first bit being sent is a "0". Then flipped changes value again, but after more than six cycles but less than ten cycles. This indicates that the next bit sent is a "1". This process may continue on, with new bits detected, until flipped stays the same for more than 10 cycles which indicates all bits of the word have been sent. If at any time flipped changes value in two cycles or less, this may indicate an error condition and the reception of the word may be aborted until flipped remains unchanged for more than 10 cycles.

As will be described further elsewhere herein, the data word transmitted may be an identification number associated with the beacon that transmitted the signal, which may be an integer value. The X,Y,Z location of the beacon may then be obtained using a lookup table. The data word may also contain the X,Y,Z location of the beacon, encoded as integer or real values.

It will be understood that there are many other established techniques for transmitting data over a carrier wave. For example, other modulation techniques such as quaterny phase shift keying, quadrature amplitude modulation, and so forth may be used. Techniques for implementing these techniques may be found in one of many textbooks on RF or wireless communications theory, such as Communication Systems by Haykin and Moher, ISBN 978-0471697909, or Fundamentals of Digital Communication by Madhow, ISBN 978-0521874144, or Wireless Communication Systems: From RF Subsystems to 4G Enabling Technologies by Du and Swamy ISBN 978-0521114035. The contents of these books are incorporated herein by reference.

For purposes of discussion, the use of the above Algorithm 1, or any other appropriate algorithm, to extract either a beacon identification or a beacon location from the light transmitted by a beacon, including with the optional assistance of a wireless transmitter 225, may be referred to as a process for "identifying a beacon".

Receiving Multiple Data Streams Using an Image Sensor

The above teachings associated with FIG. 3 through FIG. 6 allow one data stream to be monitored, but do not allow information from more than one beacon to be monitored and do not allow for the measurement of the direction of the beacon. Both of these characteristics may be obtained by using a camera in place of the photodiode 323 shown in FIG. 3. A camera may be made using, at bare minimum, optics to focus light from the environment onto an image sensor, and an image sensor generating image data at a regular rate. The art of fabricating such devices is an established art. Examples are provided in the following US Patents and Patent Applications by Geoffrey Barrows, a named inventor of the current teachings: application Ser. No. 11/685,203 titled "Multiple Aperture Optical System", filed Mar. 13, 2007; U.S. Pat. No. 7,652,754 titled "Feature Detecting Vision Sensor" issued Jan. 26, 2010; U.S. Pat. No. 8,426,793 titled "Vision Sensor" issued Apr. 23, 2013; and U.S. Pat. No. 8,629,389 titled "Low Profile Camera and Vision Sensor" issued Jan. 14, 2014. The contents of these aforementioned documents are incorporated herein by reference.

Figure 7:
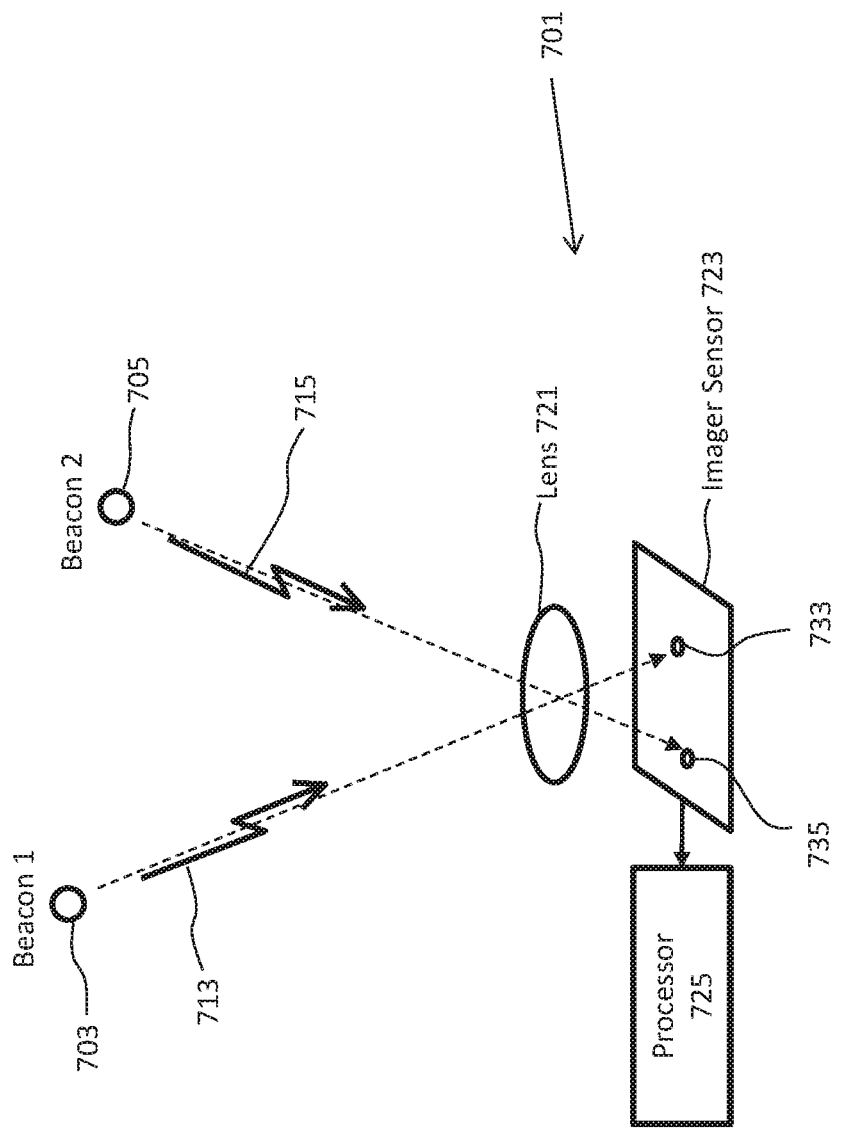
FIG. 7 depicts a camera monitoring two beacons, according to one embodiment of the invention.

Refer to FIG. 7, which depicts a receiver 701 monitoring two beacons 703 and 705, according to one embodiment of the invention. For purposes of discussion, let us first assume that the two beacons 703 and 705 and the receiver 701 are locked in place and do not move. The two beacons 703 and 705 are sending data over light 713 and 715 using the techniques depicted above. Their light 713 and 715 is focused through a lens 721 onto an image sensor 723. A processor 725 connects to the image sensor 723 and operates it, acquires image data from it, and extracts data streams from the image data. The image sensor 723 and the processor 725 thus comprise an implementation of a receiver 701. In one embodiment, the receiver 701 comprises a camera system. The two beacons 703 and 705 and the receiver 701 operate to generate and receive carrier waves at approximately the same frequency, so that the receiver 701 samples the image data about four times for every single cycle transmitted by the transmitters 703 and 705, with allowance for phase shifting and a slight frequency mismatch. Two regions 733 and 735 of the image sensor 723 will be illuminated corresponding to the two beacons 703 and 705, as shown. Regions 733 and 735 may be identified by looking for pixels of the image sensor 723 whose values change dramatically in a short time period, due to the carrier wave being sent. In order to receive the data, the processor 725 needs to receive the pixel signals associated with the two regions 733 and 735 on the image sensor 723, and then apply the aforementioned techniques to extract binary words from the beacons 703 and 705.

The weakness of the above method is that overall image sensor 723 generates a lot of data. In the case of the example of FIG. 7, only the pixel values associated with the images 733 and 735 of the beacons 703 and 705 on the image sensor 723 are needed, however the image sensor 723 may generate as an output all of the pixel values. This results in the generation of large amounts of unnecessary data, which places a substantial burden on the processor 725 and slows it down, reducing the data rate. In order to overcome this limitation, a direct addressable image sensor may be used.

A direct addressable image sensor is an image sensor that does not output the entire image array, but just the desired pixels. In this case that would be the pixel values at the two imaged locations 733 and 735 of the beacons 703 and 705. By acquiring only the pixels at and around the desired locations 733 and 735, both the image sensor 723 and the processor 725 may be operated at a higher frame rate, which speeds up the rate at which data may be transmitted. The pixels around location 733 and 735 may be sampled at rates an order of magnitude faster (e.g. ten times faster), or even two or more orders of magnitude faster (e.g. one hundred times faster, or more), by sampling only pixels in those regions, than what is obtainable by sampling every pixel of the image sensor 723 for every frame.

Methods for implementing directly addressable pixels are known. As examples, one may refer to FIG. 1 of the aforementioned U.S. Pat. No. 8,426,793 and other teachings within that patent. One may also use a logarithmic type of pixel, in which for each pixel circuit 103 of FIG. 1 of U.S. Pat. No. 8,426,793, transistors 115 and 117, photodiode 209, and capacitor 113 may be replaced with the photoreceptor circuit 201 of FIG. 2A of the aforementioned U.S. Pat. No. 7,652,754. Then, as taught in this prior art, decoder logic and analog multiplexers may be used to select one pixel as an output.

Now let us suppose that in FIG. 7 either the beacons 703 and 705 or the camera 701 are moving. In this case, the images 733 and 735 of the beacons 703 and 705 on the image sensor 723 may move as well, depending on the nature of the motion. In order to receive the data sent by the beacons 703 and 705, it will not be adequate to just monitor the same pixel over and over since the images 733 and 735 of the beacons 733 and 735 may move to different pixels before the word or even a single bit of the word is received. Thus it will be beneficial to track the motion of the images 733 and 735 of the beacons 703 and 705 as they move across the image sensor 723.

Figure 8A:
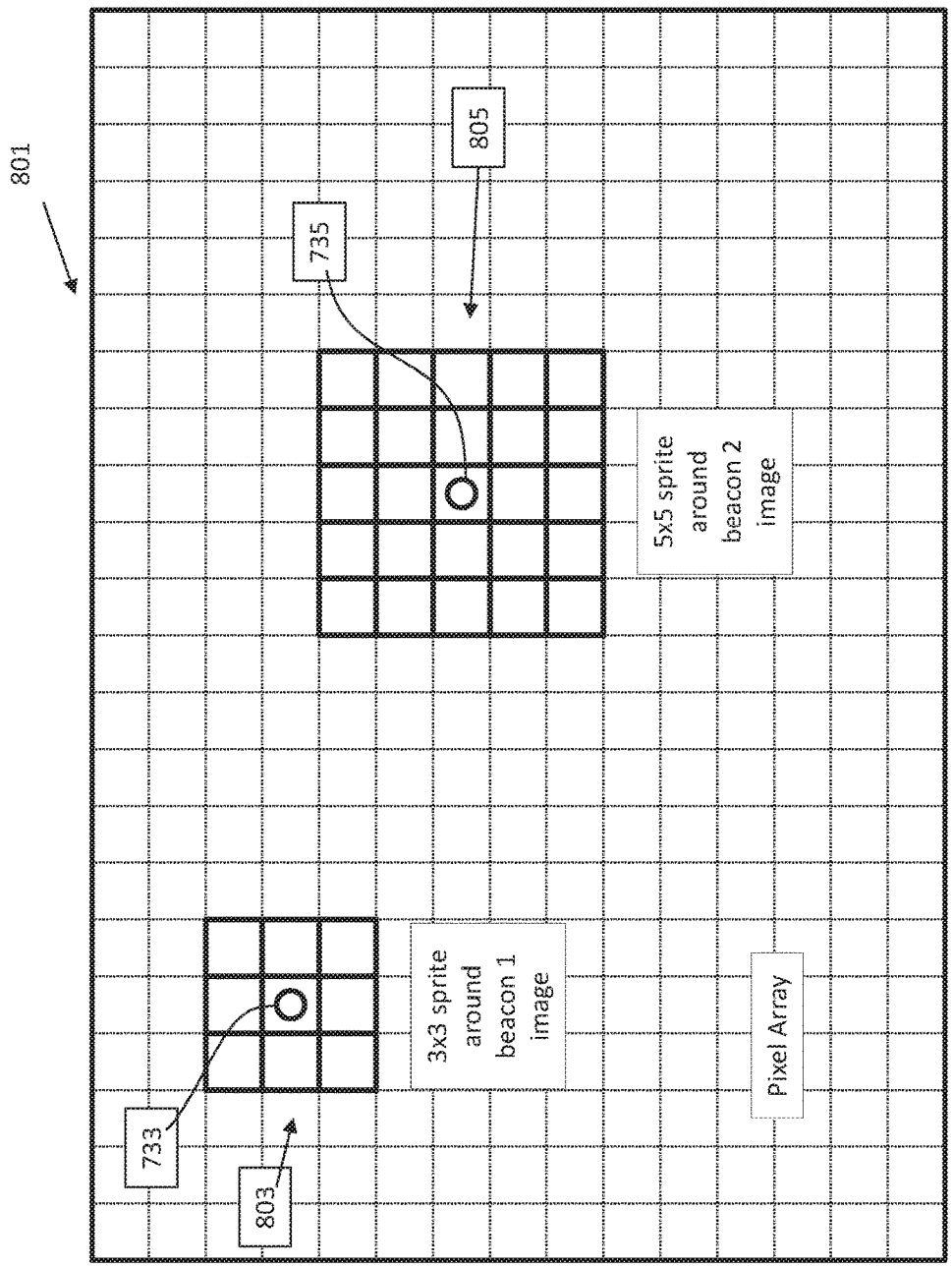
FIG. 8A depicts a sprites within a pixel array, according to one embodiment of the invention.

To support this end, let us introduce the concept of a "sprite". Refer to FIG. 8A, which depicts a 3×3 sprite 803 that surrounds the image 733 of the first beacon 703 and a 5×5 sprite 735 that surrounds the image 735 of the second beacon 705, according to one embodiment of the invention. The sprites 803 and 805 are located within a pixel array 801, which is implemented within the image sensor 723. In the definition used herein, a sprite is essentially a window of pixels that are acquired that surround the last known location of a beacon on the image sensor 723. When using a direct addressable image sensor, the acquisition of pixels within sprites surrounding known locations of beacons in general requires fewer pixels to be acquired than when using an image sensor that outputs an entire image every frame. We shall next discuss how a sprite may be used, using a 3×3 sprite, such as sprite 803. The techniques are easily modifiable for use with 5×5 sprites such as sprite 805, or any other sized sprite.

For purposes of notation, let matrix A denote the pixel values within a sprite and the value $A_{i,j}$ denote the intensity value of pixel i,j within the sprite. For 3×3 sprites, i and j may span from 1 to 3, with i indicating rows and j indicating columns. Let us suppose that the image of a beacon on the image sensor 723 is located at the pixel at row r and column c. And as before, let us assume that pixels are sampled at four times the carrier frequency.

The algorithm below indicates how sprites may be utilized, in this example with sprite A acquired four times to generate four sprite arrays A1, A2, A3, and A4:

Algorithm 2:
  Step 1: Acquire sprite array A1 at the first sampling time. For a 3×3 sprite, this involves acquiring the nine pixels $A1_{i,j}$ where i and j span 1 to 3, and the pixels cover the 3×3 region centered at row r and row c, the last known location of the beacon images on the image sensor 723. Set x1 equal to the sum of these nine pixels.
  Step 2: Acquire sprite array A2 at the second sampling time. These are the same 3×3 array of nine pixels, but acquired one quarter into the carrier wave period. Set x2 equal to the sum of these nine pixels.
  Step 3: Acquire sprite array A3 at the third sampling time, half way into the carrier wave period. Set x3 equal to the sum of these nine pixels.
  Step 4: Acquire sprite array A4 at the fourth sampling time, ¾ of the way into the carrier wave period. Set x4 equal to the sum of these pixels.
  Step 5: Compute I and Q from x1, x2, x3, and x4 as taught using the aforementioned techniques, e.g. I=x1−x3 and Q=x2−x4. This also includes tracking the base phase of the carrier wave and extracting binary values and words from the transmitted signal, as described above in Algorithm 1. Thus steps 1 through 5 of this algorithm may be performed as part of Step 1 of the above Algorithm 1.
  Step 6: Now we track the sprite A. Compute a magnitude matrix M having the same size as A1 through A4. For each pixel i,j, define a set $S_{i,j} = \{A1_{i,j}, A2_{i,j}, A3_{i,j}, A4_{i,j}\}$. Then we may define $M_{i,j} = \max(S_{i,j}) - \min(S_{i,j})$, or we may define $M_{i,j} = \text{std}(M_{i,j})$ where std( ) is a standard deviation function over the four samples of $S_{i,j}$.
  Step 7: Find k,l where k and l are within 1 . . . 3 such that the value of $M_{k,l}$ is largest. This shall be the new perceived location of the sprite. Update the values r and c as follows: r=r+k−2 and c=c+l−2. These values r and c may then be output as the location of the beacon image on the image sensor for this carrier wave cycle. Also compute and output a signal strength for the received beacon image. The signal strength may be computed from the mean or the maximum value of the elements of magnitude matrix M, or by another suitable measure.
  Step 8: Go to step 1 when it is time to sample the new sequence of pixel values, centered at the updated values of r and c.

The above algorithm 2 essentially samples the pixels around the last known locations of the beacon on the image sensor 723, and does so at the four regular intervals to allow sampling of in-phase I and quadrature Q values, and thus with the other above-described methods extracts data from the modulated carrier wave. Then the magnitude matrix M is computed to identify if the transmitter has moved. If it has, then the values r and c are updated, and the sprite acquires the next cycle of pixels at four sampling instants, but centered at the new location.

In order for the above algorithm 2 to work, it is beneficial for the acquisition of pixels during Steps 1 through 4 to be acquired at specific times with respect to the operating frequency of the transmitter (or beacon) and receiver. Suppose the carrier wave is a 100 Hz sinusoid, with a period of 10 msec. Suppose Step 1 were performed at time 0 msec. Then Steps 2, 3, and 4 are preferably performed respectively at 2.5 msec, 5.0 msec, and 7.5 msec. Most modern microcontrollers have hardware timer circuits that can facilitate this process. Then Steps 5 through 7, along with any word detection or decoding steps, would be performed fast enough that the next iteration of Step 1 can be performed at 10 msec. This may require attentive coding of software algorithms to perform these computations sufficiently quickly.

Alternatively, an entire cycle may be skipped and the next iteration of Steps 1 through 4 may occur at 20 msec, 22.5 msec, 25 msec, and 27.5 msec. Or a quarter or half of the cycle may be skipped with the computation of I and Q values modified correspondingly. It will be understood that although it is preferable and ideal for the beacons and the receiver to operate at clock rates so that all beacons transmit at exactly the same frequency and the receiver is configured to sample pixels exactly four times, equally spaced apart, every carrier wave cycle, in practice the beacons and receiver may have clocks that are imperfectly matched, and so may operate at slightly different frequencies. This is where the phase tracking mechanisms taught, for example, in Algorithm 1 may be used.

If there are two or more beacons being received simultaneously, then the aforementioned algorithm 2 may be modified so that multiple sprites are acquired in parallel. For example, suppose there are three beacons being received, with three sprites A, B, and C. Then in Step 1 three matrices A1, B1, and C1 are acquired, and in Step 2 matrices A2, B2, and C2 are acquired, and so on, with steps 5 through 7 performed once each for sprites A, B, and C. The phase tracking, bit extraction, and sprite tracking performed in the latter steps would also be performed for all received beacons in parallel.

It will be understood that using sprites to track the imaged locations of beacons has the substantial advantage that fewer pixels need to be monitored and stored. Only the pixels associated with the sprite need to be recorded; the rest can be ignored or not acquired (except for any exploratory regions for birthing new sprites, which will be discussed below). This may reduce the performance requirements for any processors used in the receiver. For example, suppose the image sensor has a resolution of 320×240=76800 pixels. If three beacons are being tracked using 3×3 sprites, then instead of storing all 76800 pixels, only 27 pixels need to be stored, which reduces memory requirements by more than three orders of magnitude. If the image sensor or image sensors used in the receiver are any of the direct addressable type, including the aforementioned direct addressable image sensors, then the use of sprites additionally reduces the number of pixels that need to be acquired and/or send from the image sensor to the processor. This may reduce, for example, the required number of ADC (analog to digital conversion) cycles, or the required number of data transfers between an image sensor and the processor operating it.

Suppose, for example, that acquiring or digitizing one pixel takes 0.1 microseconds and we are using a 320×240 image sensor. 7.68 milliseconds will be required to acquire or digitize all 76800 pixels, which limits the frame rate to 1/(76800×0.1 usec)≈130 Hz or lower. Suppose instead we were tracking three beacons using 3×3 sprites. The 27 pixels may then be acquired or digitized in just 2.7 microseconds. This allows for a much faster frame rate. By using sprites and direct addressable image sensors, the time and memory requirements may be reduced, as a practical matter, by one, two, three, four, or more orders of magnitude when compared to using an image sensor that requires all pixels to be acquired. Thus speed increases of ten, a hundred, a thousand, ten thousand, or more are possible when using sprites to acquire only the pixels that are needed.

Variations of the aforementioned algorithm 2 are possible. In a first variation, larger sprite sizes such as 5×5 may be used instead of 3×3. The larger sprite size may be beneficial when the image of a beacon is moving fast enough that it may fall off the boundary of a sprite over a single carrier wave cycle. Although 5×5 (or even 7×7 or larger) sprites involve the acquisition of more pixels, for some implementations they may result in a faster system depending on the various timing delays for example (but not necessarily) time required to configure an image sensor to receive a different sprite.

Figure 8B:
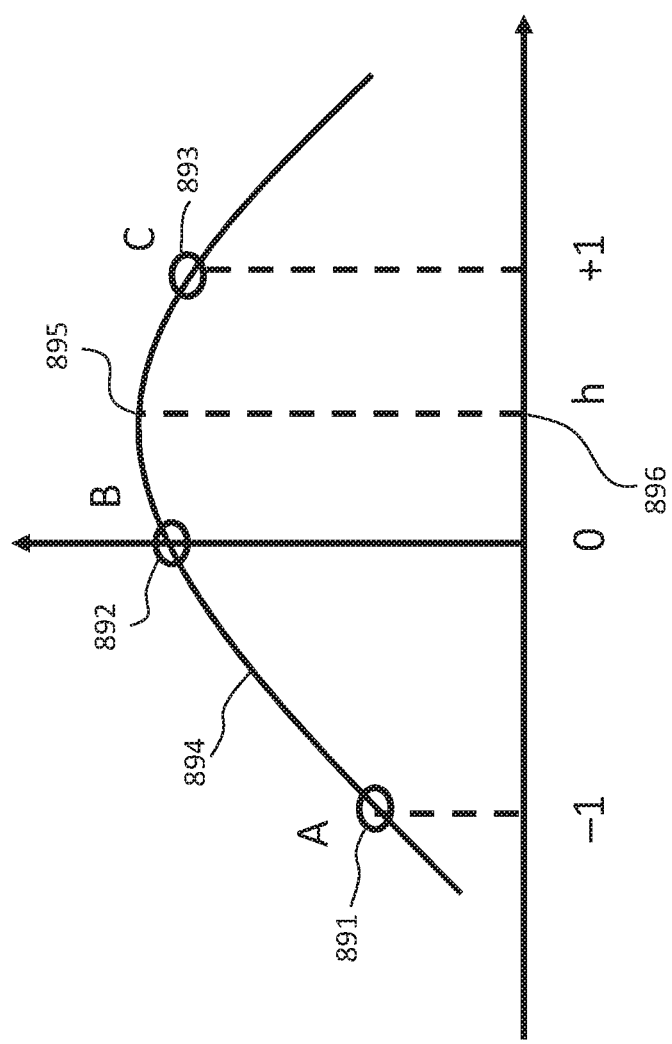
FIG. 8B depicts a quadratic curve used to compute hyperacuity, according to one embodiment of the invention.

In a second variation, the perceived location of a beacon may be refined to a sub-pixel precision using hyperacuity techniques. Refer to FIG. 8B, which depicts a quadratic curve used to compute hyperacuity, according to one embodiment of the invention. Point A 891 is located at point (−1,a), point B 892 is located at point (0,b), and point C 893 is located at point (+1,c). The 1, 0, and +1 values on the X-axis correspond to a row or column of three adjacent pixels on an image sensor. These three points define a single quadratic curve 894 that passes through all of them, which may be constructed using a second order Lagrange Polynomial. Point 895 is the maximum of the curve 894, and may be computed by computing where the first derivative of curve 894 equals zero. In FIG. 8B, the X-axis location 896 of the maxima 895 may be computed as:

$$h = \frac{c - a}{4b - 2a - 2c}$$

Now in order to use hyperacuity to refine pixel position, suppose we have 3×3 matrix M, as computed above in Step 6, which corresponds to a 3×3 block of adjacent pixels. We can set $a=M_{1,2}$, $b=M_{2,2}$, and $c=M_{3,2}$ and use the above equation to find $h_r$, e.g. h in the row direction. The estimated position of the beacon in M and in the vertical direction would be $2+h_r$. Note this value is a real number, not an integer. We can similarly refine the horizontal position estimate using a second order polynomial from $a=M_{2,1}$, $b=M_{2,2}$, and $c=M_{2,3}$, to compute a column refinement $h_r$. Then Step 7 of the above Algorithm 2 may be modified so that instead of outputting r and c as the location of the beacon's image on the focal plane, we would output $r+h_r$ and $c+h_r$. In practice, we have found we can refine the position estimate of a beacon to a precision of 20% or even 10% of the pitch or the distance between two adjacent pixels. This real-valued position estimate may be presented as an output, with the original integer-valued position estimate used for tracking the beacon.

Using hyperacuity to refine the estimate of the pixel position has several benefits. The first benefit is that the more accurate estimate of the beacon's position on an image sensor will ultimately result in a more accurate state estimate. The second benefit is that a certain level of accuracy may be obtained with an image sensor having fewer pixels. This can decrease the power consumption and cost of the overall system, as well as increase the speed of the system. For example, suppose hyperacuity allows the precision of a beacon position estimate to be improved by a factor of five. We can thus obtain similar position accuracies by using an image sensor where the pitch between pixels is increased by a factor of five, or an image sensor with ⅕ as many pixels.

In a third variation, if the beacon is operating in a noisy environment, it may be beneficial to use either a low pass filter or a Kalman filter to more accurately track the movement of a sprite as described in Step 7.

For purposes of discussion, the use of Algorithm 2 above, or any similar algorithm, to determine the location of a beacon may be referred to as a process for "tracking a beacon". Furthermore, although the teachings herein imply use of image sensors having pixels arranged in rows and columns in a square array, it is possible to use image sensors whose pixels are arranged in arrays other than square, such as rectangular arrays or hexagonal arrays.

Birth, Life, and Death of Sprites

Suppose there are a number of beacons scattered throughout an environment and a single camera, functioning as part of a receiver, is not able to see all of the beacons. This may be because a beacon is out of the camera's field of view, or the direct path between a beacon and the camera is blocked by an opaque object. Now suppose the beacons and/or the camera are undergoing motion. Depending on the nature of the motion, a beacon may become invisible to the camera, by moving off the field of view or by being blocked by an object in between. In this case, it will no longer be useful to allocate time, memory, and processing power to implement a sprite to track the beacon since it is no longer visible. In this case, the sprite may be deactivated, resulting in the "death" of a sprite. The receiver will no longer monitor the pixels associated with the deactivated sprite, and the data memory used to implement the sprite is freed up for other purposes. Similarly, a new beacon may become visible to the camera, either by entering the camera's field of view or by no longer being occluded by an object. Thus a new sprite may be activated or "birthed" to start tracking that beacon and receiving data from it. Therefore in software, sprites may thus be implemented as dynamically allocated software objects that can be activated or deactivated depending on what is observable by the camera.

Let us first consider the deactivation or "death" of sprites. A sprite may be deactivated when it leaves the receiver camera's field of view. Thus if the row or column location of a sprite reaches the edge of the receiver camera's field of view, the sprite may be deactivated. A sprite may also be deactivated if it reduces too much in strength. The matrix M as computed above in Step 6 may be used to compute a sprite's signal strength for example by monitoring the mean of the values of M or just the maximum value of M. If the sprite's signal strength drops below a predefined signal strength, or drops below the predefined signal strength for more than a predefined number of iterations of the above algorithm 2 (e.g. for more than a predefined number of carrier wave cycles), then the sprite may be deactivated. Depending on the specific implementation, it may be beneficial to use a running average of the sprite's signal strength, or it may be beneficial to not deactivate the sprite right away but implement a probationary period where the sprite is still active and attempting to track the beacon but any data received by it is being ignored. Such tests to determine when a sprite is to be deactivated may be performed as part of Step 6 or Step 7 above.

Let us consider another special circumstance and test that may warrant the deactivation of a sprite. In some cases, the environment may be filled with light sources that are not beacons but are flickering in a predictable manner. For example, if the beacons and the receiver are operating at about 100 Hz (which would be sampled 400 times a second using the above algorithms), and there is fluorescent lighting being powered by a 60 Hz power line, then there will be a strong 120 Hz flickering pattern in portions of the environment. Other types of flickering light sources are possible in man-made environments, such as infrared remote controls or the pulsed light used by some motion capture systems. Such a light source could be confused for a beacon and tracked by the sprite, including if a real beacons and the confusing light source line up at some point so that they appear in approximately the same location from the receiver camera's perspective.

Therefore, it is beneficial to have a way to detect if a sprite is locked onto one of these confusing light sources. One test may be to require that beacons transmit data words at regular intervals, and the receiver would deactivate a sprite that does not generate data recognized word within a multiple of such an interval. A second test may be to require that a beacon sends data words of a certain length, and deactivate a sprite if such a word is not received within a third predetermined time period. A third test may be to additionally use parity schemes, or require transmitted words to be part of a predetermined list, and deactivate the sprite if these conditions are not met within a certain time period. Failure of any of these tests may result in the immediate deactivation of the sprite, or the sprite may be put into a probationary state where it is still tracked, but it is not used for state estimation purposes (taught below) until the sprite later again passes all of these tests, causing the sprite to be promoted back to fully active. If the sprite has not exited the probationary state within a predetermined time period, it may be deactivated.

A fourth test to help prevent a sprite from tracking a confusing light source would be to monitor the phase shift as indicated by I and Q values between sequential cycles. For example, in the aforementioned phase tracking algorithm 1, let us define variable deltaphase as deltaphase=Dc (base, ta), as computed up in algorithm 1. If the beacon associated with the sprite and the receiver camera are operating at very similar frequencies, then deltaphase will in general be a small value except for transition cycles in which the carrier wave is flipped for some of the four sampling points x1, x2, x3, and x4, and not flipped for the other sampling points. Thus a simple test can be to require that over a period of carrier cycles, deltaphase must be less than a certain threshold for a certain number of those cycles. For example, suppose the carrier wave may flip as fast as once every four carrier wave cycles. Suppose the beacon and camera receiver frequencies are within a fraction of a percent of each other. Then one may require, for example, that over sixteen carrier wave cycles, deltaphase must be less than 0.1 radians for at least half of the carrier wave cycles or half of the iterations of the aforementioned algorithm 2. The specific thresholds to use will depend on the application and the environment, including the typical signal strengths observed, and may all be empirically determined.

Let us now discuss the birth of sprites, which will occur when a transmitter becomes visible by a camera of the receiver. The birthing of sprites is also required when the system is turned on to become operational. The receiver must detect the beacons in the environment before it can start tracking them, identifying them, and using their detected locations for state estimation. One method may be to monitor every pixel of the camera's field of view. However for reasons described above this may be impractical because of the large amount of data that must be processed. Instead, we propose searching through only part of the field of view at a time. One simple method to achieve this is to birth new sprites in empty locations. These sprites may be given a probationary status, from which they must either be promoted to a fully active status by passing the aforementioned tests, or be deactivated. In general, the first test to fail may be either the aforementioned signal strength test or the deltaphase test. When one of these probationary sprites is deactivated, a new probationary sprite may be birthed elsewhere.

However the above method for birthing sprites may result in slow detection of new sprites if these probationary spites linger too long before they are deactivated. Therefore we propose the following: For every carrier wave cycle, as implemented by one cycle of the aforementioned algorithms 1 and 2, a subset of the receiver camera's field of view, which may be called an "exploration region", may be monitored for one carrier wave cycle. Thus for every pixel in the exploratory region, four samples will be obtained. Then, for each pixel, a signal strength may be computed, either from the standard deviation of its four samples or the difference between the maximum and minimum valued samples. If the signal strength exceeds a predetermined threshold, and if the pixel is not too close to an already existing sprite (whether probationary or fully active), then a new probationary sprite may be birthed at that pixel's location. Then at the next carrier wave cycle a different and nonoverlapping exploratory region may be observed. These computations over the exploratory region thus implement a preliminary test that must be passed before new probationary sprites are born. In practice, we have found that this simple test generally detects beacons reliably, but may also detects false flickering light sources, the latter of which may have their sprites quickly deactivated by any of the aforementioned tests.

In order to search the entire receiver camera's field of view for sprites in as few cycles as possible, it is beneficial for the exploratory region to cover as many pixels as possible. In order to prevent excessive load on the receiver's processor, it may not be necessary to sample every single pixel within an exploratory region. Instead, every other pixel may be sampled, or every third pixel sampled. This may be coupled with staggering the samples by rows, for example by sampling only odd pixels in odd numbered rows and even pixels in even numbered rows.

A sprite may thus undergo a life cycle of several different states. A sprite may be in an inactive or dead state, during which the memory resources or data structure used to implement the sprite is not in use. When a sprite is birthed, for example based on identifying pixels in the exploratory region that are rapidly changing, it may enter a probationary state, until it has been tracked long enough and identified. When a word of data has been extracted from the sprite, for example using the teachings of Algorithm 1, so that the beacon associated with the sprite has been identified, the sprite may be considered fully active. If the sprite's signal quality degrades, it may re-enter the probationary state. The sprite's motion will be tracked all the while it is in a probationary state or a fully active state. Finally, a sprite may die or deactivate if it is no longer tracked. When a sprite is fully active, its position may then be used for state estimation using the teachings described below.

It will be understood that the above teachings can be applied to single-camera as well as multiple-camera receivers. FIG. 8C depicts a possible block diagram of a single camera receiver 821, comprising a lens 823 that focuses light from beacons (not shown) onto an image sensor 825, which is operated by a processor 827, according to one embodiment of the invention. The processor 827 operates the image sensor 825 and acquires pixel data from it, implements sprites to detect and track beacons, and decodes information from the detected beacons as described above. The processor 827 may also implement state estimation, which is described below.

Figure 8D:
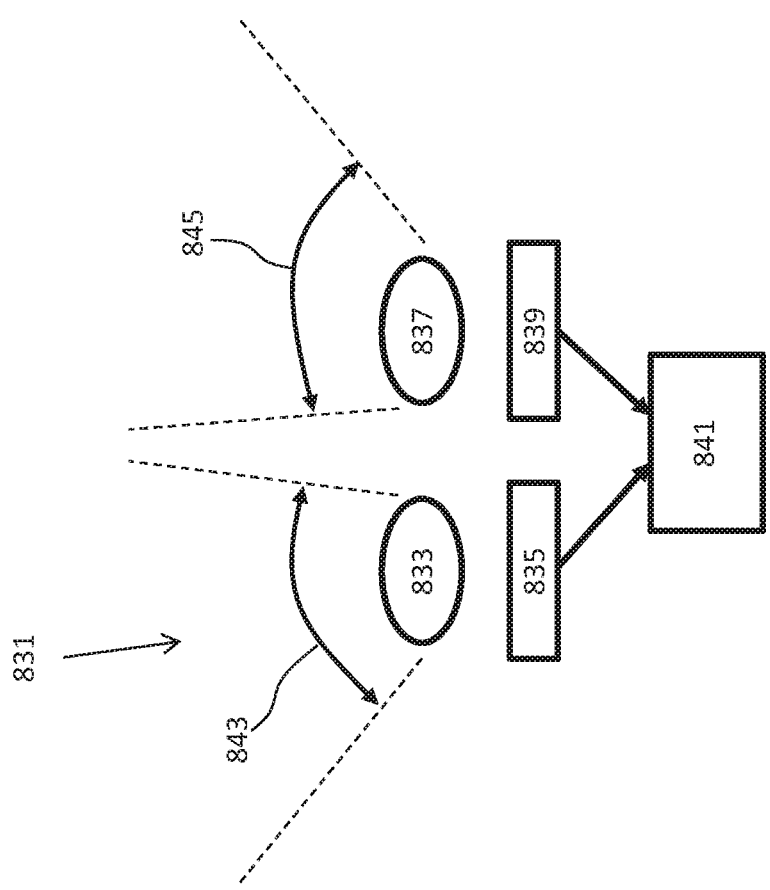
FIG. 8D depicts a block diagram of a multiple camera receiver, according to one embodiment of the invention.
Figure 8C:
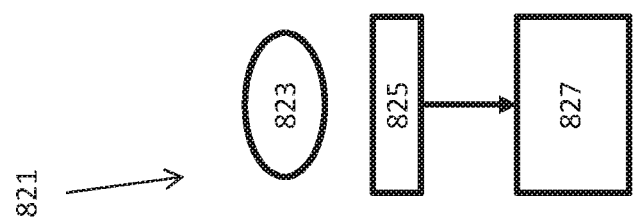
FIG. 8C depicts a block diagram of a single camera receiver, according to one embodiment of the invention.

FIG. 8D depicts a possible block diagram of a multiple camera receiver 831 in which two image sensors 835 and 839 with their respective lenses 833 and 837 are operated by a processor 841, according to one embodiment of the invention. The processor 841 may also implement the detection and tracking of beacons as described above, as well as state estimation as described below. The first image sensor 835 and first lens 833 have a first field of view 843, which depends on their orientation, and the second image sensor 839 and second lens 837 have a corresponding second field of view 845. It is beneficial for the first image sensor 835 and second image sensor 839 to be pointed in different directions so that their respective fields of view are different. This configuration can allow monitoring of a wider field of view than using just a single image sensor as shown in FIG. 8C.

FIG. 8E depicts another possible block diagram of a multiple camera receiver 851 comprising two cameras 853 and 855, according to one embodiment of the invention. Camera 853 comprises a lens 859, an image sensor 861, and a camera processor 863. Camera 853 is configured to detect, track, and identify beacons observed within its field of view 873. Camera 855 similarly contains its own lens 865, image sensor 867, and camera processor 869 configured to detect, track, and identify beacons observed within its field of view 875 using techniques described above. Cameras 853 and 855 may then send information about the detected beacons (angle of arrival or just pixel location, and any identifier or location information) to the receiver processor 871.

The receiver processor 871 may be configured to estimate state, using techniques described below. This configuration 851 also allows a larger field of view to be monitored than that of the single camera receiver 821 shown in FIG. 8C, but with the additional processing may allow operation at higher frame rates. It will be understood that for multiple camera receivers 831 and 851, more than two image sensors or cameras may be used to obtain a wider field of view, up to an including an omnidirectional field of view. Further techniques that may be used to implement such multiple camera receivers may be found in the aforementioned U.S. patent application Ser. No. 11/685,203 titled "Multiple Aperture Optical System", filed Mar. 13, 2007, by Barrows.

Let us define a term, the "span angle", of a camera system as follows: First, consider any two points that are within the field of view or field of views of the camera system. The span angel of a camera system is the maximum possible angle that may be defined by any two such points in the camera system's field of view. For example, the size of angle 877 is the span angle of the camera system 851 of FIG. 8E. The largest possible span angle is 180 degrees (a 270 degree angle becomes a 90 degree angle in the other direction).

Let us consider the case where there are two receiver cameras in an environment, each with their own image sensor and optics and processor. Suppose the two receiver cameras are connected to each other, so that they may communicate. Suppose also that the two receiver cameras have fields of view that are adjacent or overlapping, and their relative orientation to each other is known. This may occur if, for example, both cameras are mounted onto the same platform but arranged to view adjacent directions. In this case, as either the platform carrying the receiver moves or as the beacons move, there may be cases in which a beacon exits the field of view of the first camera and enters the second camera's field of view, or vice-versa. If the geometry of the two receiver camera's fields of view are known, then the first camera may alert the second camera to the possible presence of a beacon. The second camera may then set up an exploratory region within the anticipated region where the beacon will appear, and thus quickly acquire the camera and birth a sprite. This process may be used in more complicated camera systems covering the entire field of view, thus allowing a beacon to be continuously tracked no matter the pose of the platform containing the cameras.

Measuring State with Beacons

Above we discussed how to implement a receiver with one or more cameras (for example in FIG. 3, FIG. 7, and FIG. 8C to FIG. 8E and related teachings), how to detect and track beacons (for example Algorithm 2 and methods for detecting methods and birthing sprites, FIG. 7 through FIG. 8B, and related teachings), including how to identify the location of a beacon's image on a camera, and how a beacon may transmit it's identifying information and/or its location, for example by modulating a cyclical signal such as a sinusoid (for example Algorithm 1 and FIG. 4A through FIG. 6 and related teachings). We now discuss how to use the outputs detected locations of beacons on the receiver's cameras, and the known location of the beacons, to determine the location of the receiver.

Recall FIG. 2, which depicts an exemplary localization system 201. At least 3 beacons (e.g. 203, 205, 207, and 209) are spread out throughout an environment. Each beacon has a known X,Y,Z location with respect to a coordinate reference system 211. Each beacon 203, 205, 207, and 209 may be an optical transmitter (e.g. 301) that optically transmits data using methods of the type depicted in FIG. 3-FIG. 4B. Each beacon 203, 205, 207, and 209 transmits information over a light wave (e.g. 213, 215, 217, and 219) that may comprise a unique identifier, or may comprise its respective X,Y,Z location, that allows the receiver 221 to distinguish a beacon 203, 205, 207, or 209 from other beacons 203, 205, 207, or 209, and know from where it is transmitting.

The receiver 221 may then be attached to a platform 223. The platform 223 may be a mobile robot, an unmanned air vehicle, or any other item whose location or state needs to be tracked in the environment. The receiver 221 comprises one or more cameras, for example as shown in FIG. 7 and FIG. 8C through FIG. 8E, and receives the data transmitted by the beacons (203, 205, 207, and 209) using any of the algorithms described above and/or depicted in FIG. 5A through FIG. 7 and described above, or any other suitable technique. Every time the receiver 221 processes one carrier wave cycle (e.g. 411), each camera generates a list of the beacons 203, 205, 207, and 209 it has received, the row and column position of each beacon 203, 205, 207, and 209 received (including to a sub-pixel precision if hyperacuity is used), and the strength of each beacon 203, 205, 207, and 209.

If the beacon 203, 205, 207, or 209 has been monitored long enough, and its emitted signal decoded long enough, then data may have been extracted from the beacon 203, 205, 207, or 209. This data may be an identifier for the beacon 203, 205, 207, or 209, so that the beacon's X,Y,Z position may be looked up from a lookup table, or it may directly contain the beacon's X,Y,Z position. Thus for each tracked beacon 203, 205, 207, and 209 that has also been identified, the receiver knows both the beacon's X,Y,Z position in space as well as the beacon's row and column position within a camera of the receiver. All of this data may then be then sent to the receiver's processor.

If the receiver is of the form depicted in FIG. 8C or FIG. 8D, this data may be assembled into a separate data array on the respective processor 827 or 841. If the receiver is of the form depicted in FIG. 8E then this data may be sent to processor 871 where it is assembled there. It is at these processors (827, 841, or 871) where the state of the receiver 221 and thus the platform 223 may be determined. (It will be understood that depending on implementation and timing details, if the receiver configurations of FIG. 8C or FIG. 8D are used, it may be beneficial to use a second processor, so that one processor may detect and track beacons and the second processor may estimate the state of the receiver.)

In cases when a beacon 203, 205, 207, or 209 is visible by more than one camera, there may be two or more records of a beacon 203, 205, 207, or 209, each record generated in response to the same beacon 203, 205, 207, or 209 but by a different camera. The receiver system 221 may then use arbitration techniques to select just one of the beacon records for use, for example by selecting the beacon record with the strongest signal strength, or selecting the beacon record that is closest to the center of the field of view of one of the receiving cameras. The receiver system 221 will now have a single record for every beacon 203, 205, 207, and 209 received and whose X,Y,Z location is known.

As described above, the receiver 221 will be attached to the platform 223 shown in FIG. 2. The platform 223 has a six degree of freedom location state, and thus so does the receiver since the receiver is fixed attached to the platform. It is beneficial for the receiver's frame of reference to be aligned with an appropriate frame of reference of the platform, so that the platform's frame of reference is equal to the receiver's frame of reference. But if the receiver and the platform are not aligned, then the receiver's state may be mathematically transformed to determine the platform's state using well-known linear algebra and vector rotation techniques. For purposes of discussion, we will assume hereinafter that the receiver and the platform are aligned with the same reference body reference frame. (Note that when discussing the platform's "state", we are referring to just the six degrees freedom of location, and neglecting the additional six degrees of freedom associated with motion e.g. velocity and angular rate.)

Our goal is now to find the state of the receiver 221 and thus determine the state of the platform 223. Let us define the actual state of the receiver S as the six element vector S=(X, Y, Z, R, P, Y) where X, Y, and Z represent lateral displacements, and R, P, and Y represent roll, pitch, and yaw pose angles, all with respect to the coordinate system 101 of FIG. 1. Let the six element vector Se be the same form as S but represent an estimated state of the receiver, e.g. Se=(Xe, Ye, Ze, Re, Pe, Ye). Ideally we want to compute and refine Se to be as close to S as possible.

Figure 9A:
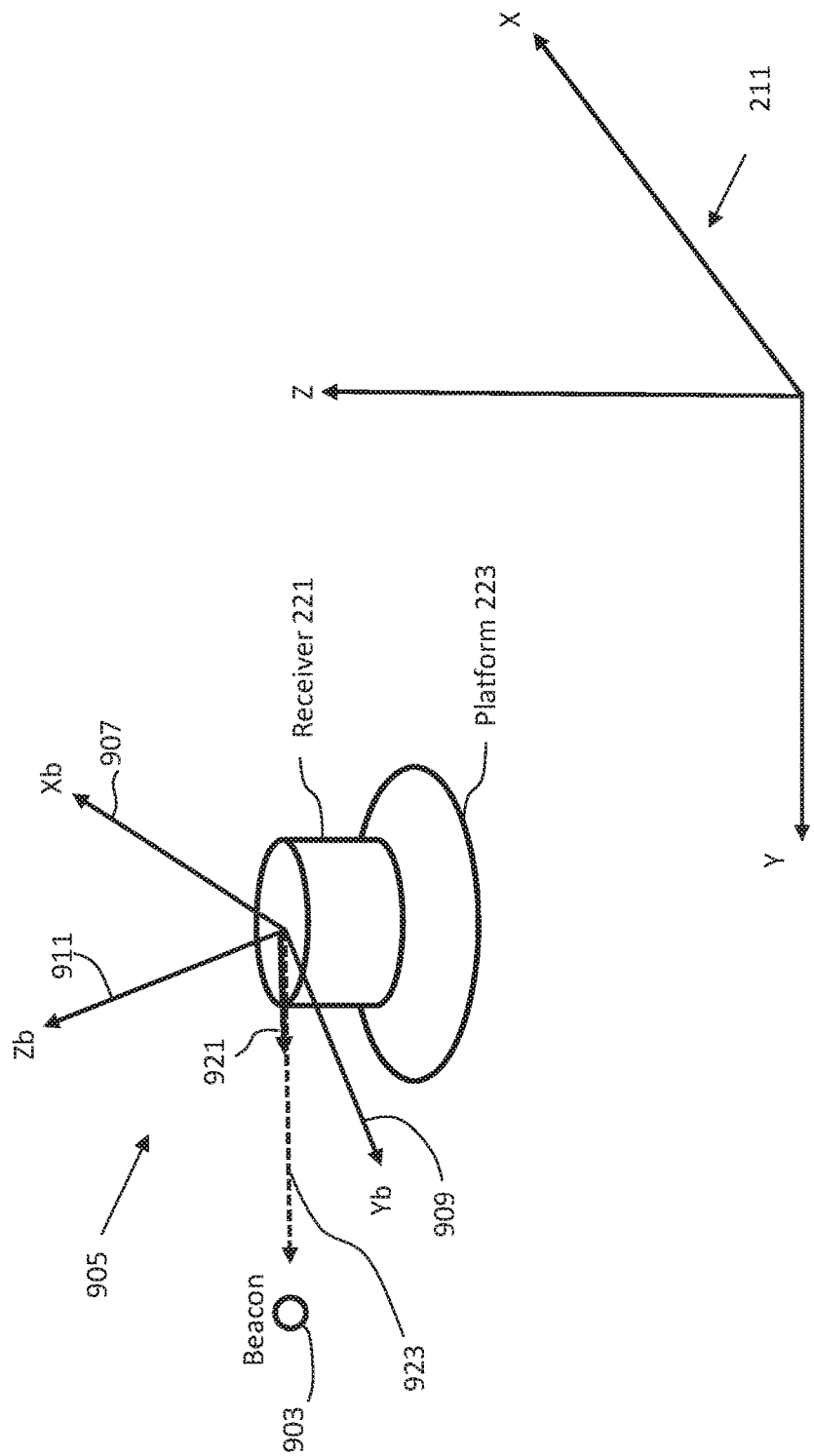
FIG. 9A depicts the construction of unit vectors based on received beacon angles, according to one embodiment of the invention.

Refer to FIG. 9A, which is used to depict the construction of unit vectors based on received beacon angles according to one embodiment of the invention. Shown are the environment's global coordinate system 211, the location of one beacon 903 (of the many beacons), and a body coordinate system 905 that is fixed to and relative to the receiver 221. The body coordinate system 905 is defined by directions Xb 907, Yb 909, and Zb 911, which are also constructed according to a right-hand rule.

Let us suppose that the calibration parameters of the cameras of the receiver 221 are known, so that each pixel location within a camera's field of view may be associated with a pose angle relative to the receiver 221. Such camera calibration parameters may incorporate, for example, the known pose and position of each camera with respect to the receiver 221 and its body coordinate system 905, the geometry of the pixel array within each camera's image sensor, the focal length and position of the optics above each image sensor, and any relevant distortion parameters. As described above, the receiver's 221 processor will have a record of each beacon 903 that has been identified along with its row and column location on the image sensor associated with the camera observing the beacon 903.

From the camera's calibration parameters, the receiver 221 may generate a received unit vector, as defined within the receiver's 221 body coordinate system, that points in the direction of the beacon 903, for example unit vector 921 which is co-aligned with vector 923 that points to beacon 903. A unit vector is a three element vector (xu, yu, zu) such that $xu^2+yu^2+zu^2=1$. If there are N identified beacons 903 received by the receiver, then a total of N unit vectors may be generated. Let us use these N unit vectors to generate an optically determined beacon angle vector Bo having 3N elements and of the form Bo=(x1, y1, z1, x2, y2, z2, . . . , xN, yN, zN) where xi, yi, and zi are the three elements of the unit vector associated with beacon 903 i and measured with respect to the receiver's 221 body coordinate system or reference frame 905. Thus if three beacons are being tracked and have been identified, the minimum recommended number of beacons 903, Bo will have nine elements. Note that for defining Bo (and Be which will be discussed below), the index i is over only detected and identified beacons 903, not over all known beacons 903 in the environment which may or may not at any one time be tracked. Index i is an index for defining Bo, and is not necessarily the actual identifier for a beacon 903.

Figure 9B:
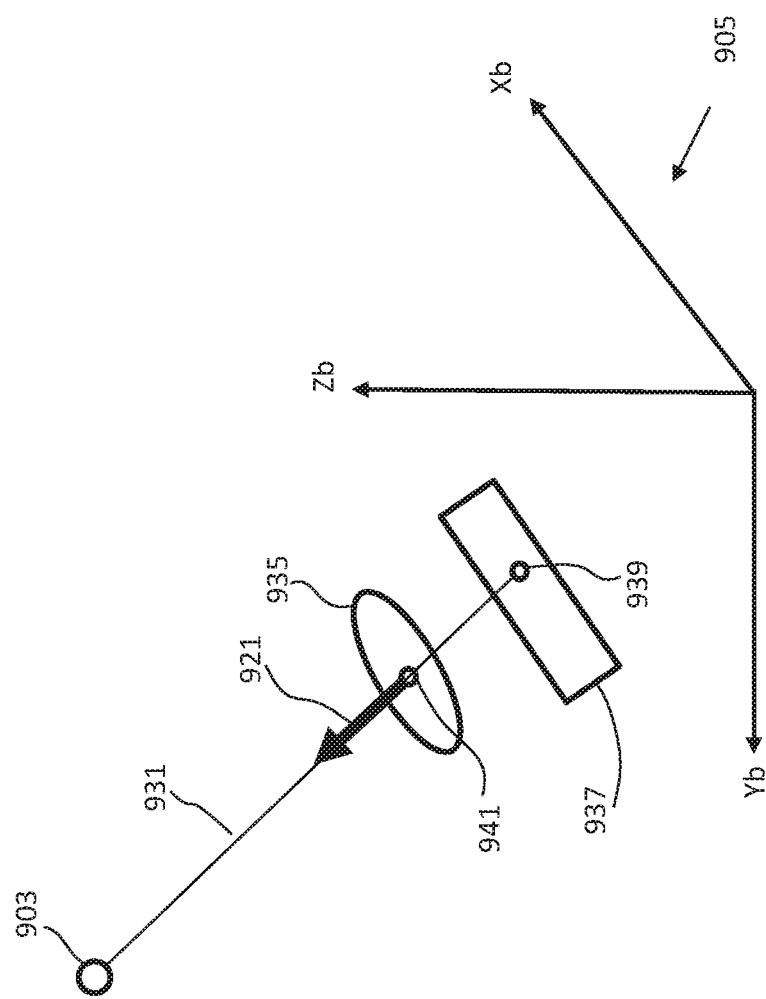
FIG. 9B depicts generating a unit vector from camera calibration parameters using a pinhole lens model, according to one embodiment of the invention.

Let us discuss further how a three-element vector 921 associated with one beacon 903 may be computed. Refer to FIG. 9B, which depicts how a unit vector 931 may be generated from camera calibration parameters using a pinhole lens model, according to one embodiment of the invention. Suppose light 931 from beacon 903 travels through a lens 935 to focus onto an image sensor 937 at point 939. Using the techniques described above for example in Algorithm 2, the receiver will know which row and column of the image sensor 937 are illuminated, perhaps to a sub-pixel precision. Lens 935 and image sensor 937 are be part of one camera of the receiver 221. Using classic pinhole optics, the lens 935 may be modeled as a pinhole 941, thus points 903, 941, and 939 are on the same line e.g. 931.

The location of the lens 935, and thus the pinhole 941, and the location of the image sensor 937 are known relative to the receiver's coordinate system 905 as part of the calibration parameters. Because the position of the pinhole 941 and image sensor 937 are known, and the row and column of the pixel associated with point 939 are known, the unit vector 921 may be constructed collinear with line 931 but of unit length. Other camera calibration parameters that may be used to create a more accurate estimate of vector 921 include any other distortions of classical camera theory including but not limited to pincushion distortion, barrel distortion, and fisheye distortion.

Alternatively, instead of using the pinhole optics model of FIG. 9B, it may be possible to calibrate the camera system of the receiver by placing it on a turntable, exposing it to beacons at a variety of angles, and then identifying which rows and columns of any camera's image sensors are illuminated. Later on when the receiver is in used in operation, interpolation techniques may be used to generate unit vector 921 from a known row and column of an image sensor that is illuminated. A variety of methods may be used as long as the unit vector 921 is accurately constructed. The above process for generating unit vectors may then be repeated for every beacon that has been tracked and identified.

Now consider the estimated state Se, the receiver's approximation of its actual state S. Given that the receiver knows the X,Y,Z location of each detected beacon in the environment, it will similarly be able to construct an estimated beacon angle vector Be=(xe1, ye1, ze1, xe2, ye2, ze2, . . . , xeN, yeN, zeN) where xei, yei, and zei form the unit vector, in the receiver's body reference frame 905, that point to where beacon i should be oriented based on the known location of the beacon and if it were true that the estimated state Se of the receiver is the actual state S. The unit vector defined by xei, yei, and zei may be computed by computing the vector (Xb−Xe,Yb−Ye,Zb−Ze), where Xb,Yb,Zb define the location of the beacon in X,Y,Z space, normalizing that vector to a unit length, and rotating that according to the estimated pose angles Re, Pe, and Ye to determine where that beacon should be visible. It will be understood that Be and Bo are generated using the same beacon order.

For discussion purposes, let us suppose first that the state vector S is known, e.g. Se=S. It will follow that the two vectors Be and Bo will be nearly identical. Any differences between Be and Bo may be attributed to small errors in the camera calibration patterns, limited accuracies in estimating the locations of beacon images on camera image sensors, e.g. the output of Step 7 of Algorithm 2, numerical errors, noise, and other related errors or inaccuracies. Suppose now that the state vector is not known, e.g. Se≠S. It follows that the difference between Be and Bo will be more substantial. We can define an error measure based on the Euclidean (or other) distance between Be and Bo. Intuitively, it will be understood that the further apart Se and S are, the greater the error measure will be between Be and Bo. This error measure thus is a clue as to how close the estimated state Se is to S, and can serve as a proxy measure of the accuracy of Se in estimating S. In order for the receiver to estimate S, it can take the approach of starting with an initial estimate of Se of the receiver's state S, and iteratively refine Se to reduce the error between Be and Bo. Any algorithm that finds the value of Se by reducing the error between Be and Bo may be used. The value of Se that results in the least error between Bo and the respective Be resulting from Se may thus be an estimate of the state S.

Let us now discuss how to generate a state estimate Se from the beacon angle vector Bo and the known locations of the beacons. One may use the classic and well-known Gauss-Newton algorithm, which is taught, for example, in the book "Numerical methods for least squares problems", ISBN 0-89871-360-9, written by A. Bjorck and published in 1996. This algorithm assumes that the vector Bo has been measured, and we are thus trying to estimate S from the known beacon locations. Below is one illustrative method to estimate the state S from Bo using the Gauss-Newton algorithm. The algorithm below may be performed any time a new vector Bo is generated by the receiver, e.g. every time Algorithms 1 and 2 above have been performed over one carrier wave cycle, provided enough beacons have been tracked and identified.

Algorithm 3:

Step 1: Set Se to an initial estimate of the state S. Se may be generated from the last known or measured location of the receiver, say from a previous iteration of this algorithm, or one extrapolated by other means, or Se may be an arbitrary value or initial guess based on the known environment. Set iteration counter c=0.

Step 2: Compute estimated beacon angle vector Be from state estimate Se and based on the detected image locations of the tracked beacons (e.g. row and column outputs from Step 7 of Algorithm 2) and the calibration parameters of the cameras of the receiver.

Step 3: Compute the Jacobian matrix J, where element i,j is the partial derivative as follows:

$$I_{i,j} = \frac{\partial B_i(Se)}{\partial Se_j}$$

where $B_i$ (Se) is mathematically the function that generates element i of the estimated beacon angle vector Be based on state estimate Se. These partial derivatives may be numerically computed through numerical differentiation by perturbing individual elements of Se and observing the change in vector Be. For example, one may first perturb the first element j=1 of the state vector Se, e.g. the estimated X location Xe, by a small delta amount, and recompute estimated beacon angle vector Be when perturbed as such, and measure how much Be has changed divided by the perturbation amount, to compute the first column of the Jacobian matrix J, and repeat the process for the other five elements of the state vector Se. This implements a one-point finite difference method of numerical differentiation. A slightly more accurate estimate of the Jacobian matrix may be obtained using a two-point finite difference method by perturbing each element of Se in both the positive and negative directions. Note that J will have 3N rows, where N is the number of tracked and identified beacons used to form Bo, and 6 columns, corresponding to the 6 elements of the state estimator Se.

Step 4: Compute $Se=Se-(J^T J)^{-1} J^T (Be-Bo)$. This produces a refined estimate for Se.

Step 5: Compute Error $Err=\sqrt{\Sigma_i (Be_i - Bo_i)^2}$

Step 6: Correct Se so that angles are within allowable range (see below)

Step 7: If Err is adequately small, go to Step SUCCESS. The threshold that determines success may be empirically determined.

Step 8: Increment c. If c>the maximum allowable iterations, then go to Step FAIL.

Step 9: if Se is "exploding", e.g. it has a value or magnitude that is obviously unreasonable, for example several orders of magnitude larger than the distance between the origin and the beacon furthest from the origin, then go to Step FAIL Step 10: Go to Step 2.

Step SUCCESS: Let the value Se be the computed state value. The value Err can be a confidence metric—the smaller the value of Err, the more accurate the state estimation. Stop.

Step FAIL: The algorithm has failed to produce a state estimate. Stop.

Essentially the Gauss-Newton algorithm iteratively computes Se until subsequent iterations change little, implying the estimated state Se has converged to a value close to S. We have observed that if the initial estimate of Se in Step 1 is "reasonably close" to the correct state S, three beacons are identified, and the three beacon locations are known to a reasonable accuracy, and the computation of the beacon angle vectors Bo are adequately accurate, then algorithm 3 will converge to the correct state. Thus it is beneficial for the initial estimate of Se in Step 1 to be as close as reasonably possible to the actual state.

However much like any convergence algorithm, it can happen that the initial estimate Se is too far off of S, for example the first time the above algorithm 3 is run once enough beacons have been tracked and identified. The subsequent values of Se computed in iterations of Step 4 may thus converge to an inaccurate "local minimum", or may "explode" or diverge. In this case, we have found that we can randomly or systematically try different initial states estimates, and again apply the above algorithm 3, until we find an initial state that is adequately close to allow convergence. In practice, this may be accomplished by setting Se to the center so that Xe, Ye, and Ze are in the center of the environment, and repeating the above algorithm with different angles Re, Pe, and Ye until convergence is obtained. For some applications the pose angles may be constrained, for example air vehicles which generally fly level but may vary in yaw angle Ye. In this case, we can systematically explore different initial values of Ye but set Re and Pe to zero.

Step 6 of algorithm 3 deserves discussion. The purpose of this step is to ensure that yaw and roll angles stay within the range of $-\pi$ to $\pi$ and that the pitch angle stays within the range of $-\pi/2$ to $\pi/2$. This may be performed as follows: First, if any of the three angles are outside the range of $-\pi$ to $\pi$, then add or subtract enough multiples of $2\pi$ to bring these angles within range. Second, if the pitch angle P is greater than $\pi/2$, we reflect the angles across the Z axis as by setting the $P=\pi-P$. If the pitch angle P is less than $-\pi/2$ then we similarly reflect angles across Z axis by setting $P=-\pi-P$. In either case in which the pitch angle P was reflected across the Z axis, we then add the value $\pi$ to both the roll and yaw angles, and again correct these angles (by adding or subtracting $2\pi$) to bring them within the range $-\pi$ and $\pi$. Intuitively, if one reflects the pitch angle across the pole, one must then rotate the yaw angle by a half turn and the roll angle by half a turn to restore the orientation.

Note that the length of Be and Bo may vary over time depending on the number of beacons being tracked at any one time, which will impact the dimensions of any other vectors or matrices generated below.

Beacon Considerations and Reflections

There are several considerations that are beneficial to consider and mitigate. First, for the general use case, the above algorithm 3 requires at least three beacons to be tracked in order to estimate the full six degree of freedom state S. This is because each beacon effectively generates two equations (on each from azimuth and elevation), and a total of six independent equations are required to compute the six unknowns. (It will be understood that although each beacon corresponds to three elements of the Ba or Bo vector, these three elements form a unit length vector and thus really have only two degrees of freedom.) We have found that in practice using more than three beacons produces a more accurate state estimate. Using more than three beacons also improves the reliability of the system in case one beacon is lost or is temporarily obscured. We suggest using as many beacons as economically feasible and the application allows, in particular if the environment has various objects inside that may occlude beacons, or if the environment is a complex shape where at some locations only a fraction of the beacons are available.

The exception to this first consideration is if the platform on which the receiver is mounted is constrained to travel over fewer than five degrees of freedom, for example on a flat surface allowing two degrees of linear travel and one degree of rotation. In this case, it may be possible to use just two beacons. However the above equations will have to be modified to account for the reduced degrees of freedom.

Second, it is also beneficial for the beacons to be spread out in the environment and viewed from different directions. If the beacons are all in one direction on one side of the receiver, the numerical errors associated with the above computations will be larger and produce erroneous estimations of state. This effect can be compounded if the triangle plane formed by the three beacons is perpendicular to the line drawn between the receiver and a point interior to the triangle, and the triangle is small in area. These effects may be mitigated by spreading beacons throughout the environment. Similar to field of view, it is possible to define the span angle of a set of beacons in the environment, relative to the receiver, as the largest possible angle between any two beacons as viewed from the receiver. Span angles of 90 degrees, 120 degrees, and more are desirable. It is most beneficial for the beacons to be placed all around the receiver, so that they may be viewed in all directions.

Third, certain beacon location setups should be avoided. In particular, one should avoid placing multiple beacons collinearly, e.g. all within a line. This condition may lead to an ill-conditioned Jacobian J that is difficult to invert. Three beacons placed in a line will produce redundant information and not generate the six independent equations necessary to determine state.

Fourth, it is possible in some environments for optical reflections to occur. This can happen if there are highly reflective objects in the environment. This can also occur if the direct view of one beacon from the receiver is obscured, but the beacon illuminates a reflective object. In this case, the elements of beacon angle vector Bo associated with the reflected beacon will be incorrect, which in turn can produce an erroneous state estimate. In practice, we have found that such errors may be detected by noting when Err is too high or exceeds a threshold. If the above algorithm 3 converges, but Err is several or more times as large as typically experienced for the environment, then it is possible that the reflection of one of the beacons is being tracked rather than the beacon itself.

If it is suspected that the reflections of a beacon are being tracked, and there are four or more beacons total being tracked, then there are methods that may be employed to identify which beacon is a reflection. This may be achieved, for example, by repeating the above algorithm 3 multiple times, but each time eliminating one beacon from the above calculations (e.g. by deleting the corresponding three elements from the beacon angle vectors, as if that beacon was not detected). If the error value Err drops when one beacon is eliminated, then that beacon is most likely a reflection. This process can be repeated, if desired, to remove additional reflections. It will be understood that reflection elimination is another reason that it is beneficial for more than three beacons to be used in an environment.

System Variations

There are variations to the above teaching that can further improve performance for specific applications. In a first variation, a wireless transmitter is located within the environment in addition to the beacons. Additionally, a wireless receiver is connected to the receiver. The wireless transmitter may then transmit a list of the beacons present including their locations and identification numbers, which may be received by the receiver. This transmission may occur over Wi-Fi, ISM, Bluetooth, or any other frequency and/or protocol.

This variation was already mentioned above and illustrated in FIG. 2 by the wireless transmitter 225. This variation allows the receiver to enter an environment without first knowing the beacon locations. Such a configuration may be useful for robotic applications where platforms may enter previously unvisited areas and thus not have a-priori knowledge of the environment. If the environment is large, with hundreds or thousands of beacons scattered in different areas, then each area (or room) may contain its own transmitter that communicates the locations of only the beacons in the vicinity. When the robotic platform leaves one room for another, it can thus look out only for beacons it expects to find nearby. Such a configuration also may allow the same beacon identifier to be used multiple times in a larger environment.

For example, two rooms may be located on opposite sides of a building, with enough structural details (walls etc.) so that there is no location in which the receiver may simultaneously view a beacon from the first room and a beacon from the second room. Each of these two rooms may have a wireless transmitter that is weak enough that the receiver will detect only one of the two wireless transmitters. Each wireless transmitter may then send beacon information (nearby beacon ID numbers and their respective positions) for the beacons in its room. In this case, the same beacon ID numbers may be used in both rooms, since with the assistance of the wireless transmitter, the receiver will know the location of the beacon it is receiving.

In a second variation, the aforementioned beacon system is used in conjunction with other sensory and environmental detection systems. For example, an environment may be outfitted with multiple beacons as described above, and an air vehicle (or any other mobile robotic platform, whether airborne, on the ground, under water, or in space) may be outfitted with a receiver that measures the air vehicle's state from the beacons. However, the air vehicle may also be outfitted with other vision systems, for example stereo vision, optical flow sensing, SLAM (simultaneous localization and mapping), laser range finding, structured light, sonar, or other sensory mechanisms. This includes sensor mechanisms for detecting objects or obstacles in the vicinity of the robot. Both sets of systems may thus be used in a complementary manner to increase the reliability of the air vehicle and further reduce the chances of crashes.

For example, the state estimate from the beacon can help assist with hover in place or in keeping the air vehicle in a safe area, while on-board sensor systems can perform addition obstacle detection and avoidance. Thus if one system temporarily fails due to some circumstance, the other system may temporarily take over and prevent a crash or collision or other failure. Or alternatively, the beacon-based system may be used to provide general navigation information to the mobile robot, while object detection sensors may be used to avoid objects that the robot has not been programmed to avoid. The two systems may be used in a complementary manner to reduce the demands on each system. For example, if the air vehicle has sensors to avoid obstacles, it can use the obstacle or object detection sensors to avoid collisions, and then use the aforementioned beacon and receiver system to obtain state information, but at a slower rate. This may allow for implementation of a lighter or less expensive receiver system.

In fact, for some implementations, it may be possible to implement obstacle detection and localization using the same hardware. Refer to FIG. 10, which depicts a combined stereo vision and localization system 1001, according to one embodiment of the invention. A mobile robot 1003 may have four stereo camera boards 1005, 1007, 1009, and 1011 mounted on it. Each stereo camera board may have two actual cameras, e.g. cameras 1021 and 1023 on camera board 1005. A processor on each camera board may have software that can be used to detect nearby objects using stereo vision, optical flow, or other visual features, and may also have software for detecting beacons in the environment, such as beacons 1031, 1033, 1035, and 1037. Methods for detecting obstacles using stereo vision or optical flow form an established art. A central processor 1041 on the mobile robot 1003 may then decide whether to perform localization using the beacons, or avoid obstacles using stereo vision or optical flow, or both, and activate different algorithms accordingly including in the stereo camera boards.

In a third variation, the beacons may actually be mounted on a platform rather than on static structures in an environment. If three or more beacons are mounted on a first platform, and the receiver is mounted on a second platform, then the receiver will measure its state relative to the first platform rather than to an objective frame of reference. Such a configuration may be useful for assisting with docking purposes, for example allowing an air vehicle to land on a moving ground vehicle, or allowing two air vehicles to connect while airborne. Such a configuration may also be useful for allowing multiple platforms to travel in formation. From a fundamental sense of physics, such a configuration is fundamentally identical to that of the beacons mounted on static structures since frames of references are arbitrarily defined.

A fourth set of variations to the above system may be constructed by using alternative methods of transmitting light from the beacons. For example, digital information (beacon identification numbers and/or location) may be transmitted using other modulation schemes such as Manchester coding, on-off keying, or even by sending pulses of light in which the timing of the pulse transmission encodes data. It may also be possible for each beacon to transmit a constant, unmodulated carrier wave, but at a different frequency. In these cases, Algorithm 2 may be used to track a beacon, and Algorithm 3 may be used to estimate state, but Algorithm 1 and associated methods will need to be adapted to extract beacon identification and/or beacon location information accordingly. Each variation may have its own advantages and disadvantages, for example having different beacons transmit constant carrier waves at different frequencies may allow a beacon's identification number to be detected in less time, but may limit the number of beacons that can be placed into an environment.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention.

What is claimed is:

1. A system for determining the location of an object in an environment comprising:
    a plurality of optical transmitters, each configured to emit an optical transmission different from the optical transmission of another of the plurality of optical transmitters, wherein each optical transmission comprises a signal, and wherein each optical transmitter is positioned at a location spaced apart from another of the plurality of optical transmitters within the environment;
    one or more optical receivers configured to be mounted to the object, the one or more optical receivers further configured to receive one or more of the optical transmissions and to generate a set of transmitter angle vectors, wherein each transmitter angle vector is associated with an image of one of the plurality of optical transmitters, and is based on the angle between the associated optical transmitter and a reference frame of the one or more optical receivers, and the location of the associated optical transmitter; and
    a computing device communicatively coupled to the one or more optical receivers and configured to estimate the location of the object based on the set of transmitter angle vectors and the locations of the three or more optical transmitters.

2. The system of claim 1, wherein:
    the signal is a substantially cyclical signal that is modulated according to a data stream associated with the optical transmitter emitting the optical transmission, and
    for each optical transmission, the one or more optical receivers are capable of extracting the data stream from the signal, and determining the location of the optical transmitter emitting the optical transmission based on the data stream.

3. The system of claim 2, wherein the substantially cyclical signal has a phase that is modulated according to the data stream.

4. The system of claim 1, wherein each of the one or more optical receivers comprises a camera system.

5. The system of claim 4, wherein for each optical transmission, optics of the camera system are configured so that the majority of a light of the optical transmission is acquired by an associated window of pixels that comprises substantially fewer pixels than a total number of pixels within the camera system, wherein the associated window of pixels comprises a plurality of rows of pixels and a plurality of columns of pixels, and the one or more optical receivers generates the transmitter angle vector using the light acquired by the associated window of pixels.

6. The system of claim 5, wherein the camera system is capable of digitizing only the pixels within the window of pixels.

7. The system of claim 6, wherein the camera system achieves a higher frame rate than what is possible if the camera system acquires every pixel of the total amount of pixels within the camera system.

8. The system of claim 6, wherein for each optical transmission, the camera system acquires the window of pixels associated with the optical transmission by acquiring pixel signals from an acquisition window of pixels that overlaps the associated window of pixels, and the camera system is configured to move the acquisition window of pixels in response to a relative motion between the optical receiver and the plurality of optical transmitters to continue acquiring the associated window of pixels and to keep the associated window of pixels illuminated by light from at least one of the plurality of optical transmitters.

9. The system of claim 1, wherein:
    each of the one or more optical receivers comprises a camera system, and for each optical transmission, optics of the camera system is configured so that the majority of a light of the optical transmission is focused on an associated window of pixels that comprises substantially fewer pixels than a total number of pixels within the camera system, wherein the associated window of pixels comprises a plurality of rows of pixels and a plurality of columns of pixels, and the transmitter angle vector associated with the optical transmission is generated based on a location of a brightest pixel of the window of pixels that receives more light than every other pixel of the window of pixels.

10. The system of claim 9, wherein for each optical transmission, the location of the brightest pixel of the window of pixels associated with the optical transmission is determined to a sub-pixel precision using a light intensity of the brightest pixel and light intensities of the pixels adjacent to the brightest pixel in the window of pixels.

11. The system of claim 1, wherein each transmitter angle vector is associated with an image of the associated optical transmitter, and is computed based on a subpixel precision estimate of the location of the image of the associated optical transmitter.

12. The system of claim 1, wherein a span angle of the plurality of optical transmitters is greater than 90 degrees when measured from the location of the one or more optical receivers.

13. The system of claim 1, wherein a span angle of the optical transmitters is greater than 120 degrees.

14. The system of claim 1, wherein a field of view of the one or more optical receivers is greater than 90 degrees.

15. The system of claim 1, wherein a field of view of the one or more optical receivers is greater than 180 degrees.

16. The system of claim 1, wherein a field of view of the one or more optical receivers is greater than 270 degrees.

17. The system of claim 1, wherein a field of view of the one or more optical receivers is substantially omnidirectional.

18. The system of claim 1, wherein:
the one or more optical receivers comprises a plurality of image sensor chips and a processor, wherein each image sensor chip of the plurality of image sensor chips is separate from every other image sensor chip of the plurality of image sensor chips;
the processor is configured to operate the plurality of image sensor chips and receive image data from the plurality of image sensor chips; and
each image sensor chip is configured to monitor a field of view having at least a portion that is different from the other image sensor chips of the plurality of image sensor chips.

19. The system of claim 1, wherein:
the one or more optical receivers comprises a plurality of cameras;
each camera comprises a camera processor and an image sensor, and is configured to monitor a field of view having at least a portion that is different from the other camera of the plurality of cameras; and
each camera processor is configured to operate the image sensor of the camera, and is configured to send image data to the computing device.

20. A receiver system attached to an object for determining a location of the object in an environment comprising:
one or more optical receivers configured to receive optical data from two or more optical transmitters and to generate a set of transmitter angle vectors; and
a computing device communicatively coupled to the one or more optical receivers and configured to estimate the location of the object based on the set of transmitter angle vectors and locations of the two or more optical transmitters; wherein
each transmitter angle vector is associated with an image of one of the two or more optical transmitters, and is based on the angle between the associated optical transmitter and a reference frame of the one or more optical receivers and the location of the associated optical transmitter.

21. The receiver system of claim 20, wherein:
each transmitter angle vector is associated with a pixel location in the optical receiver and a set of pixels surrounding the pixel location, the one or more optical receivers comprises a total set of pixels, and is configured to define a first set of pixels to acquire and a second set of pixels to not acquire, wherein the first set of pixels and the second set of pixels are subsets of the total set of pixels, the first set of pixels comprises a two dimensional array of pixels, and the one or more optical receivers is configured to acquire the first set of pixels without acquiring the second set of pixels.

22. The receiver system of claim 21, wherein the one or more optical receivers is configured to acquire the first set of pixels at a rate greater than 1 second/(the total set of pixels×$T_{pixel}$), where $T_{pixel}$ is a time required for the one or more optical receivers to acquire a single pixel.

23. The receiver system of claim 21, wherein the one or more optical receivers is configured to acquire the first set of pixels at a rate greater than 10×(1 second/(the total set of pixels×$T_{pixel}$)), where $T_{pixel}$ is a time required for the one or more optical receivers to acquire a single pixel.

24. The receiver system of claim 21, wherein the one or more optical receivers defines the first set of pixels and the second set of pixels based on the pixel locations associated with the set of transmitter angle vectors.

25. The receiver system of claim 20, wherein each transmitter angle vector is associated with a pixel location in the optical receiver and a set of pixels surrounding the pixel location, and the pixel location is determined to an accuracy that is less than a pitch between adjacent pixels of the set of pixels.

26. The receiver system of claim 20, wherein the one or more optical receivers are configured to decode an identifier associated with each optical transmitter generating the optical transmissions, and to determine the location of the one or more optical receivers based on a look-up table and the identifier associated with each optical transmitter.

27. The receiver system of claim 20, wherein the receiver system is configured to determine the identities of the two or more optical transmitters based on the optical transmissions, and is capable of optically tracking the two or more optical transmitters based on the optical transmissions independent of determining the identities of the two or more optical transmitters.

28. The receiver system of claim 20, wherein the receiver system is configured to receive the locations of the two or more optical transmitters from a wireless transmitter in the environment.

29. The receiver system of claim 20, wherein:
the object is a mobile robot;
the receiver system is configured to send location information to the mobile robot; and
the mobile robot is configured to control its motion based on the location information.

30. The receiver system of claim 29, wherein the receiver system or the mobile robot further comprises object detection devices capable of detecting objects in the environment that are nearby the mobile robot and generating nearby object information, and the mobile robot is configured to control is motion based additionally on the nearby object information.

31. A method for determining the location of an object in an environment comprising the steps of:
receiving a plurality of optical transmissions from a plurality of optical transmitters with an optical receiver comprising one or more image sensor chips, wherein each image sensor chip of the one or more image sensor chips is associated with an optical device capable of forming an image of part of the environment on the image sensor chip;
extracting an associated signal from each optical transmission;
generating a plurality of image locations based on the plurality of optical transmissions, wherein each image location is generated based on an optical transmission and a location of the associated optical transmission on the one or more image sensor chips, and based on the geometries of the pixel arrays of the one or more image sensor chips;

generating a plurality of transmitter angle vectors based on the plurality of image locations and based on the associated signal of each optical transmission; and determining the location of the object based on the plurality of transmitter angle vectors and a location of each optical transmitter.

32. The method of claim 31, wherein each image location is additionally generated based on light intensities of a plurality of pixels associated with the image location, and is substantially accurate to a precision that is smaller than the pitch of adjacent pixels of the plurality of pixels.

33. The method of claim 31, further comprising:
selecting a first set of pixels to acquire, wherein the first set of pixels comprises a plurality of rows of pixels and a plurality of columns of pixels;
selecting a second set of pixels to not acquire; and
acquiring the first set of pixels without acquiring the second set of pixels, wherein the plurality of optical transmissions are received based on the first set of pixels.

34. The method of claim 33, wherein the plurality of optical transmissions is received at a rate greater than 1 second/(a total number of pixels of the one or more image sensor chips×$T_{pixel}$), where $T_{pixel}$ is a time required by the optical receiver to acquire a single pixel from the one or more image sensor chips.

35. A receiver system attached to an object for determining a location of the object in an environment comprising:
one or more optical receivers configured to receive optical transmissions from two or more optical transmitters and to generate a set of transmitter angle vectors, wherein the one or more optical receivers comprises one or more image sensors and one or more optical devices arranged according to a geometric configuration, the one or more image sensors are associated with one or more pixel geometries, and each transmitter angle vector of the set of transmitter angle vectors is generated based on the geometric configuration and the one or more pixel geometries; and
a computing device communicatively coupled to the one or more optical receivers and configured to estimate the location of the object based on the set of transmitter angle vectors and locations of the one or more optical transmitters; wherein each transmitter angle vector is associated with one of the two or more optical transmitters, and is based on the angle between the associated optical transmitter and a reference frame of the one or more optical receivers and the location of the associated optical transmitter, and each transmitter angle vector is associated with a pixel location in the one or more optical receivers, and the pixel location is determined to an accuracy that is less than the minimum distance between any two adjacent pixels of the one or more optical receivers.

36. A receiver system attached to an object for determining a location of the object in an environment comprising:
one or more optical receivers configured to receive optical transmissions from two or more optical transmitters and to generate a set of transmitter angle vectors; and
a computing device communicatively coupled to the one or more optical receivers and configured to estimate the location of the object based on the set of transmitter angle vectors and locations of the one or more optical transmitters;
wherein each transmitter angle vector is associated with one of the two or more optical transmitters, and is based on the angle between the associated optical transmitter and a reference frame of the one or more optical receivers and the location of the associated optical transmitter; and
the one or more optical receivers is configured to define a first set of pixels to acquire and a second set of pixels to not acquire, wherein the first set of pixels comprises a two dimensional array of pixels, acquire the first set of pixels without acquiring the second set of pixels, and generate the set of transmitter angle vectors based on the first set of pixels.

37. The receiver system of claim 36, wherein the one or more optical receivers is configured to receive the optical transmissions at a rate greater than the 1 second/(a total number of pixels of the one or more optical receivers×$T_{pixel}$), where $T_{pixel}$ is a time required by the one or more optical receivers to acquire a single pixel.

* * * * *